US010455108B2

United States Patent
Kanaya

(10) Patent No.: US 10,455,108 B2
(45) Date of Patent: Oct. 22, 2019

(54) IMAGE READING APPARATUS, CONTROL METHOD, AND CONTROL PROGRAM

(71) Applicant: PFU LIMITED, Kahoku-shi, Ishikawa (JP)

(72) Inventor: Shingo Kanaya, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 16/072,862

(22) PCT Filed: Mar. 3, 2016

(86) PCT No.: PCT/JP2016/056656
§ 371 (c)(1),
(2) Date: Jul. 25, 2018

(87) PCT Pub. No.: WO2017/149732
PCT Pub. Date: Sep. 8, 2017

(65) Prior Publication Data
US 2018/0376028 A1 Dec. 27, 2018

(51) Int. Cl.
*H04N 1/409* (2006.01)
*H04N 1/32* (2006.01)
(Continued)

(52) U.S. Cl.
CPC ......... *H04N 1/047* (2013.01); *H04N 1/00005* (2013.01); *H04N 1/00029* (2013.01);
(Continued)

(58) Field of Classification Search
CPC ............... H04N 1/047; H04N 1/00005; H04N 1/00029; H04N 1/00037; H04N 1/00602;
(Continued)

(56) References Cited

U.S. PATENT DOCUMENTS

2005/0068452 A1* 3/2005 Steinberg ............. H04N 1/4097
348/335
2005/0254103 A1 11/2005 Sugiyama et al.
(Continued)

FOREIGN PATENT DOCUMENTS

JP 11-187271 A 7/1999
JP 2005-065033 A 3/2005
(Continued)

OTHER PUBLICATIONS

English translation of Office action issued in related Japanese Application No. 2016-041177, dated Oct. 25, 2016, 3 pages.
(Continued)

*Primary Examiner* — Quang N Vo
(74) *Attorney, Agent, or Firm* — Lewis Roca Rothgerber Christie LLP

(57) ABSTRACT

An image reading apparatus, a control method, and a control program accurately determining a position of a foreign object are provided. The image reading apparatus includes an image capturing device, provided in a first unit or a second unit, for capturing a first image and a second image, a reference member provided in the first unit or the second unit, a driving device for moving the second unit, a foreign object determining module for determining whether or not a foreign object appears in the first image, and a position determining module for determining whether the foreign object exists on the image capturing device side or on the reference member side, based on an absolute value of a difference between a gradation value in a region where the foreign object appears within the first image and a gradation value in a region corresponding to the region where the foreign object appears, within the second image when the foreign object appears in the first image, wherein the first image is an image of the reference member captured when the second unit is provided at one of the first position or the
(Continued)

second position, and the second image is an image of the reference member captured when the second unit is provided at the other of the first position or the second position.

8 Claims, 19 Drawing Sheets

(51) Int. Cl.
    *H04N 1/00*       (2006.01)
    *H04N 1/047*     (2006.01)
    *H04N 1/04*       (2006.01)
    *H04N 1/19*       (2006.01)

(52) U.S. Cl.
    CPC ..... *H04N 1/00037* (2013.01); *H04N 1/00602* (2013.01); *H04N 1/04* (2013.01); *H04N 1/19* (2013.01); *H04N 1/3263* (2013.01); *H04N 1/32625* (2013.01); *H04N 1/409* (2013.01); *H04N 1/4097* (2013.01)

(58) Field of Classification Search
    CPC ........ H04N 1/04; H04N 1/19; H04N 1/32625; H04N 1/3263; H04N 1/409; H04N 1/4097
    See application file for complete search history.

(56) References Cited

U.S. PATENT DOCUMENTS

| | | |
|---|---|---|
| 2014/0078558 A1 | 3/2014 | Kanaya |
| 2014/0079460 A1 | 3/2014 | Kanaya |
| 2015/0022868 A1* | 1/2015 | Shimizu ................ H04N 1/125 358/475 |

FOREIGN PATENT DOCUMENTS

| | | |
|---|---|---|
| JP | 2005-328216 A | 11/2005 |
| JP | 2010-010867 A | 1/2010 |
| JP | 2010-177745 A | 8/2010 |
| JP | 2011-087213 | 4/2011 |
| JP | 2011-259164 A | 12/2011 |
| JP | 2012-204972 | 10/2012 |
| JP | 2014-060488 A | 4/2014 |
| JP | 2015-023379 A | 2/2015 |

OTHER PUBLICATIONS

English translation of International Search Report (dated Sep. 8, 2017) and Written Opinion (dated Apr. 5, 2016) of related PCT Application No. PCT/JP2016/056656, 5 pages.
International Preliminary Report on Patentability of related PCT Application No. PCT/JP2016/056656, dated Sep. 4, 2018, 5 pages.
Office Action of related U.S. Appl. No. 15/178,139, dated Jun. 2, 2017, 13 pages.
English translation of International Search Report (dated Sep. 8, 2017) and Written Opinion (dated Aug. 22, 2018) of related PCT Application No. PCT/JP2016/073670, 12 pages.
International Preliminary Report on Patentability of related PCT Application No. PCT/JP2016/073670, dated Sep. 4, 2018, 8 pages.
English translation of related Chinese Application No. 201610861176.5, dated Sep. 21, 2018, 6 pages.
Office Action dated Apr. 8, 2019 regarding U.S. Appl. No. 16/080,605 corresponding to U.S. Appl. No. 16/072,862 (12 pages).
Japanese Office Action dated May 14, 2019 regarding Japanese Patent Application No. 2018-502505 corresponding to U.S. Appl. No. 16/072,862 (4 pages) with English Translation (5 pages).

* cited by examiner

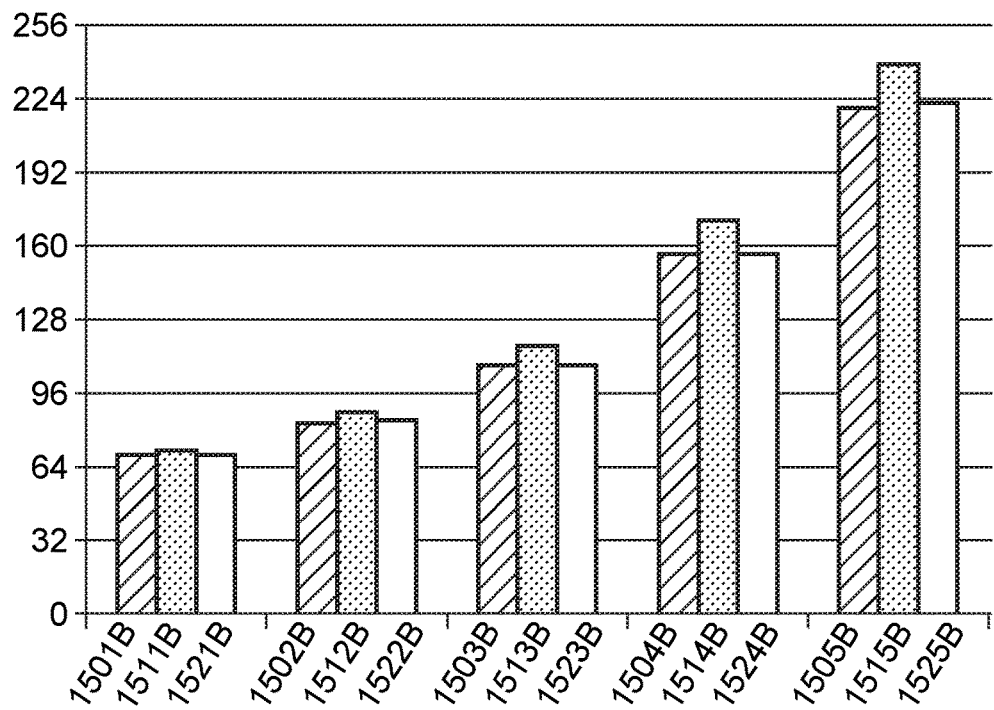
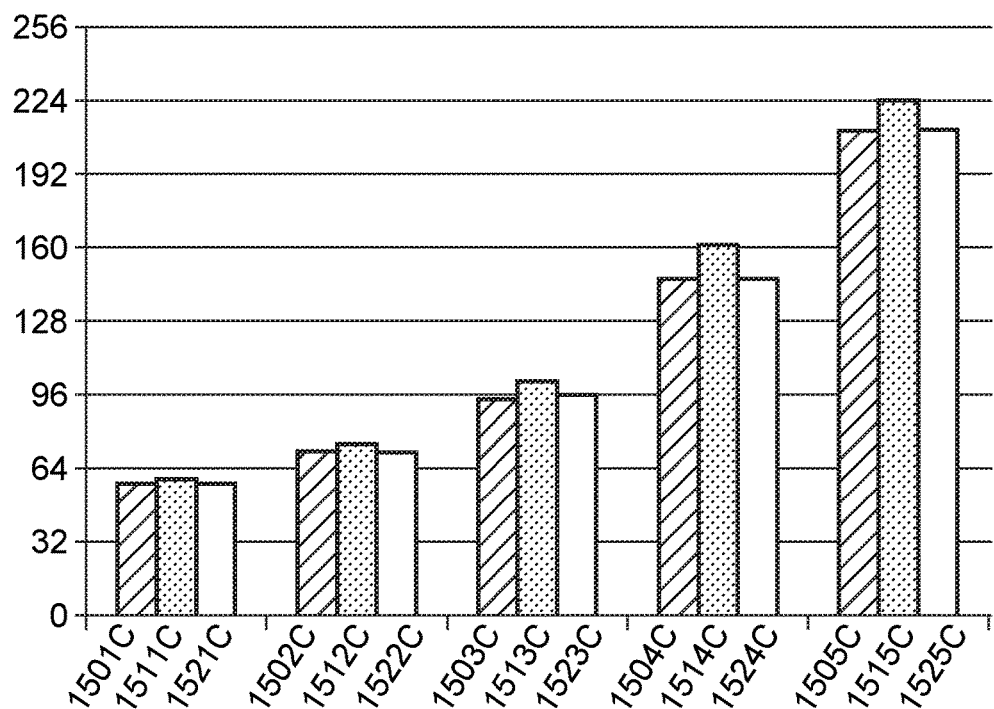

IMAGE READING APPARATUS, CONTROL METHOD, AND CONTROL PROGRAM

CROSS-REFERENCE TO RELATED APPLICATION(S)

This application is a National Phase Patent Application and claims the priority of International Application Number PCT/JP2016/056656, filed on Mar. 3, 2016, the entire contents of which are incorporated herein by reference.

FIELD

The present disclosure relates to image reading apparatus, control method and control program, and more particularly, image reading apparatus, control method and control program for detecting a foreign object appearing in an image.

BACKGROUND

Typically, while transferring a document, an image reading apparatus such as a scanner captures an image of the document, using an image capturing device such as a line sensor with imaging elements arranged one-dimensionally. For this reason, a foreign object such as paper powder, dust and paste, etc., attached to a glass surface of the image capturing device may cause vertical stripe noise to appear on a document image acquired by capturing the document.

A copying machine including a CIS having its reading surface coated to prevent reading vertical stripes generated as a paste-like foreign object attached to a document adheres to the reading surface is disclosed. The copying machine detects the thickness of the document and adjusts the gap between the glass surface of the CIS and the roller portion of a reading roller in accordance with the detection result (see patent literature 1).

CITATIONS LIST

Patent Literature

Patent literature 1: Japanese Unexamined Patent Publication (Kokai) No. 2011-87213

SUMMARY

Technical Problem

It is necessary for an image reading apparatus to appropriately correct a document image such that vertical stripe noise does not appear in the document image. Typically, various characters, pictures, illustration patterns, or the like have been printed on a document, making it difficult to correctly determine whether or not a foreign object appears in the document image. On the other hand, using a captured image of a plain reference plate arranged at a position facing an image capturing device and that has been acquired when a document is not transferred makes it possible to accurately determine whether or not a foreign object appears in the document image. When a foreign object appears in the captured image of the reference plate, it is however difficult to correctly determine whether the foreign object exists on an image capturing device side or on a reference plate side. Whether or not vertical stripe noise appears in a document image depends on a position of a foreign object. For this reason, accurate determination of a position of a foreign object is demanded for appropriately correcting a document image.

It is an object of image reading apparatus, control method, and control program is to accurately determine a position of a foreign object.

Solution Problem

The image reading apparatus according to an embodiment includes a first unit fixed to the image reading apparatus, a second unit provided to be movable between a first position facing the first unit and a second position facing to the first unit and more separated from the first unit than the first position, an image capturing device, provided in one of the first unit or the second unit, for capturing a first image and a second image, a reference member provided in the other of the first unit or the second unit, a driving device for moving the second unit between the first position and the second position, a foreign object determining module for determining whether or not a foreign object appears in the first image, and a position determining module for determining whether the foreign object exists on the image capturing device side or on the reference member side, based on an absolute value of a difference between a gradation value in a region where the foreign object appears within the first image and a gradation value in a region corresponding to the region where the foreign object appears, within the second image when the foreign object appears in the first image, wherein the first image is an image of the reference member captured when the second unit is provided at one of the first position or the second position, and the second image is an image of the reference member captured when the second unit is provided at the other of the first position or the second position.

The control method according to an embodiment is a method of an image reading device including a first unit fixed to the image reading apparatus, a second unit provided to be movable between a first position facing the first unit and a second position facing to the first unit and more separated from the first unit than the first position, an image capturing device, provided in one of the first unit or the second unit for capturing a first image and a second image, a reference member provided in the other of the first unit or the second unit, and a driving device for moving the second unit between the first position and the second position, the method includes determining whether or not a foreign object appears in the first image, and determining whether the foreign object exists on the image capturing device side or on the reference member side, based on an absolute value of a difference between a gradation value in a region where the foreign object appears within the first image and a gradation value in a region corresponding to the region where the foreign object appears, within the second image when the foreign object appears in the first image, wherein the first image is an image of the reference member captured when the second unit is provided at one of the first position or the second position, and the second image is an image of the reference member captured when the second unit is provided at the other of the first position or the second position.

The control program according to an embodiment is a program of an image reading device including a first unit fixed to the image reading apparatus, a second unit provided to be movable between a first position facing the first unit and a second position facing to the first unit and more separated from the first unit than the first position, an image capturing device, provided in one of the first unit or the second unit for capturing a first image and a second image, a reference member provided in the other of the first unit or the second unit, and a driving device for moving the second unit between the first position and the second position, the program causes the image reading device to execute determining whether or not a foreign object appears in the first image, and determining whether the foreign object exists on the image capturing device side or on the reference member side, based on an absolute value of a difference between a gradation value in a region where the foreign object appears within the first image and a gradation value in a region corresponding to the region where the foreign object appears, within the second image when the foreign object appears in the first image, wherein the first image is an image of the reference member captured when the second unit is provided at one of the first position or the second position, and the second image is an image of the reference member captured when the second unit is provided at the other of the first position or the second position.

Advantageous Effects of Invention

According to the present embodiment, the image reading apparatus, the control method, and the control program can accurately determine a position of a foreign object.

The object and advantages of the invention will be realized and attained by means of the elements and combinations, in particular, pointed out in the claims. It is to be understood that both the foregoing general description and the following detailed description are exemplary and explanatory, and are not restrictive of the invention, as claimed.

BRIEF DESCRIPTION OF DRAWINGS

FIG. 15B is a graph expressing a relation between a light quantity of light radiated from the light source and a gradation value.

FIG. 15C is a graph expressing a relation between a light quantity of light radiated from the light source and a gradation value.

DESCRIPTION OF THE EMBODIMENTS

Hereinafter, a document conveying apparatus according to an embodiment, will be described with reference to the drawings. However, it should be noted that the technical scope of the invention is not limited to these embodiments, and extends to the inventions described in the claims and their equivalents.

Figure 1:
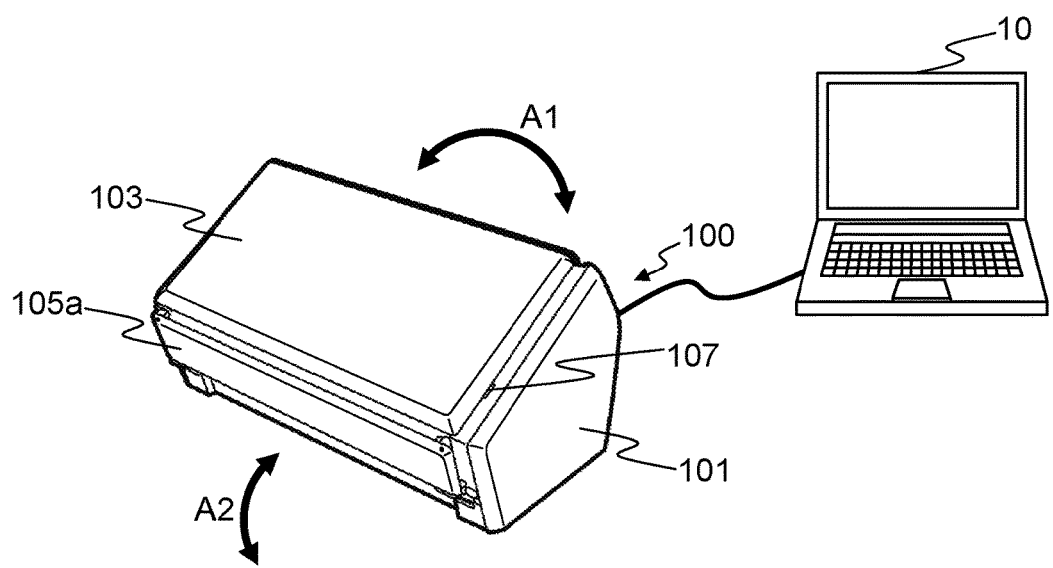
FIG. 1 is a configuration diagram of one example of an image processing system according to an embodiment.

FIG. 1 illustrates a configuration diagram of one example of the image processing system according to an embodiment.

The image reading apparatus of a present embodied example is configured as an image reading apparatus 100 such as an image scanner. The image processing system 1 includes the image reading apparatus 100 and an information processing apparatus 10. In FIG. 1, the image reading apparatus 100 is depicted by a perspective illustration.

The image reading apparatus 100 includes a lower housing 101, an upper housing 102, a document tray 103, a front surface cover 105a, an opening/closing detector 107, and the like. The image reading apparatus 100 is connected to the information processing apparatus 10. The image processing apparatus 10 is a personal computer, or a personal digital assistant, for example.

Figure 2:
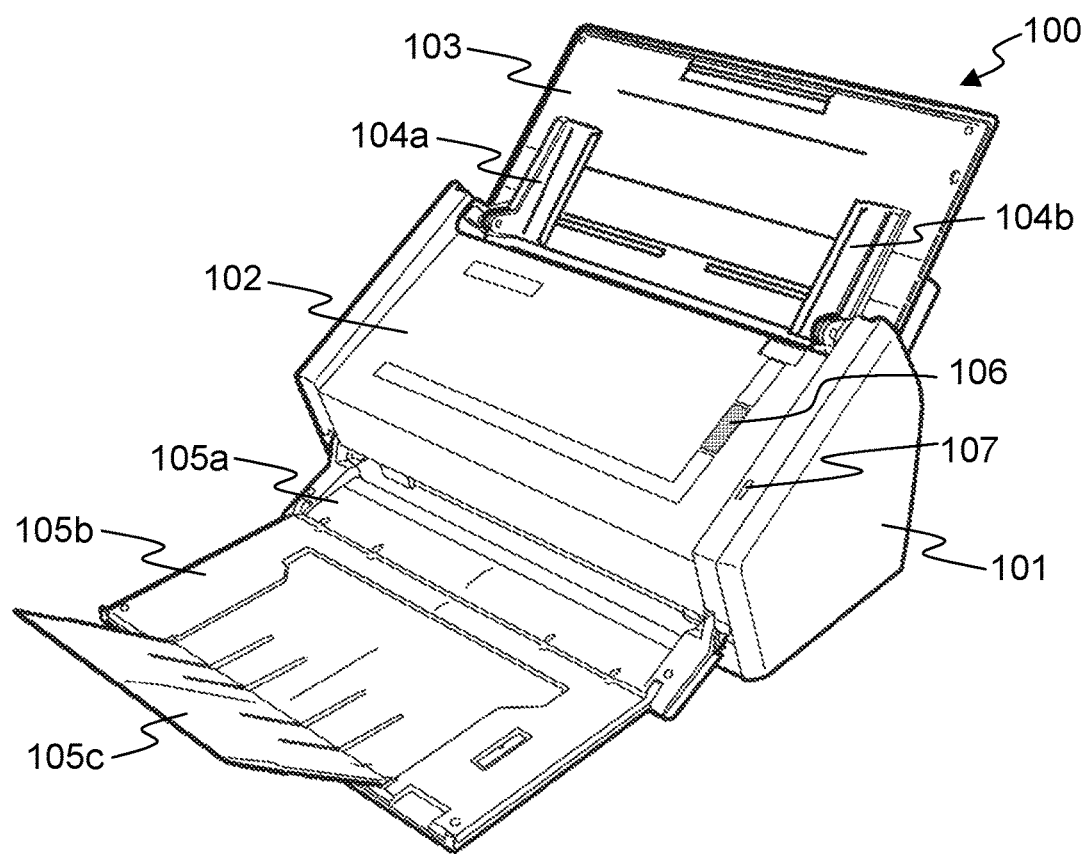
FIG. 2 is a perspective view of an image reading apparatus 100 to which a document tray 103 has been set.

FIG. 2 is a perspective view of the image reading apparatus 100 where the document tray 103 is set.

The image reading apparatus 100 includes an upper surface cover 105b, an auxiliary cover 105c, and operation button 106. The document tray 103 engages the lower housing 101 by hinges so as to be rotated in the direction indicated by the arrow A1. In a state of FIG. 1, the document tray 103 is arranged at a position where the document tray 103 covers the upper housing 102, the upper surface cover 105b, and the auxiliary cover 105c. Thus, the document tray 103 functions as an exterior cover.

On the other hand, in the state as depicted in FIG. 2, the document tray 103 is arranged such that documents can be placed on the document tray 103. Provided in the document tray 103 are side guides 104a and 104b that are movable in the right and left directions of the conveyance direction of a document. The side guides 104a and 104b are aligned with a width of a document to restrict the document in the width direction of the document.

The front surface cover 105a engages the lower housing 101 by hinges so as to be rotated in the direction indicated by the arrow A2. The upper surface cover 105b is connected at one end to the front surface cover 105a, and is connected at the other end to the auxiliary cover 105c. When it is necessary, the auxiliary cover 105c is let out from the upper surface cover 105b to hold a document.

The operation button 106 is arranged on the surface of the upper housing 102, which button generates and outputs an operation detection signal by pressing down. The opening/closing detector 107 includes a contact detecting sensor arranged at a position that faces the document tray 103 in a closed state, and detects an opened state and a closed state of the document tray 103. The opening/closing detector 107 generates and outputs an opening/closing detection signal of which signal value changes by the state of the document tray 103 whether it is open or closed.

Figure 3:
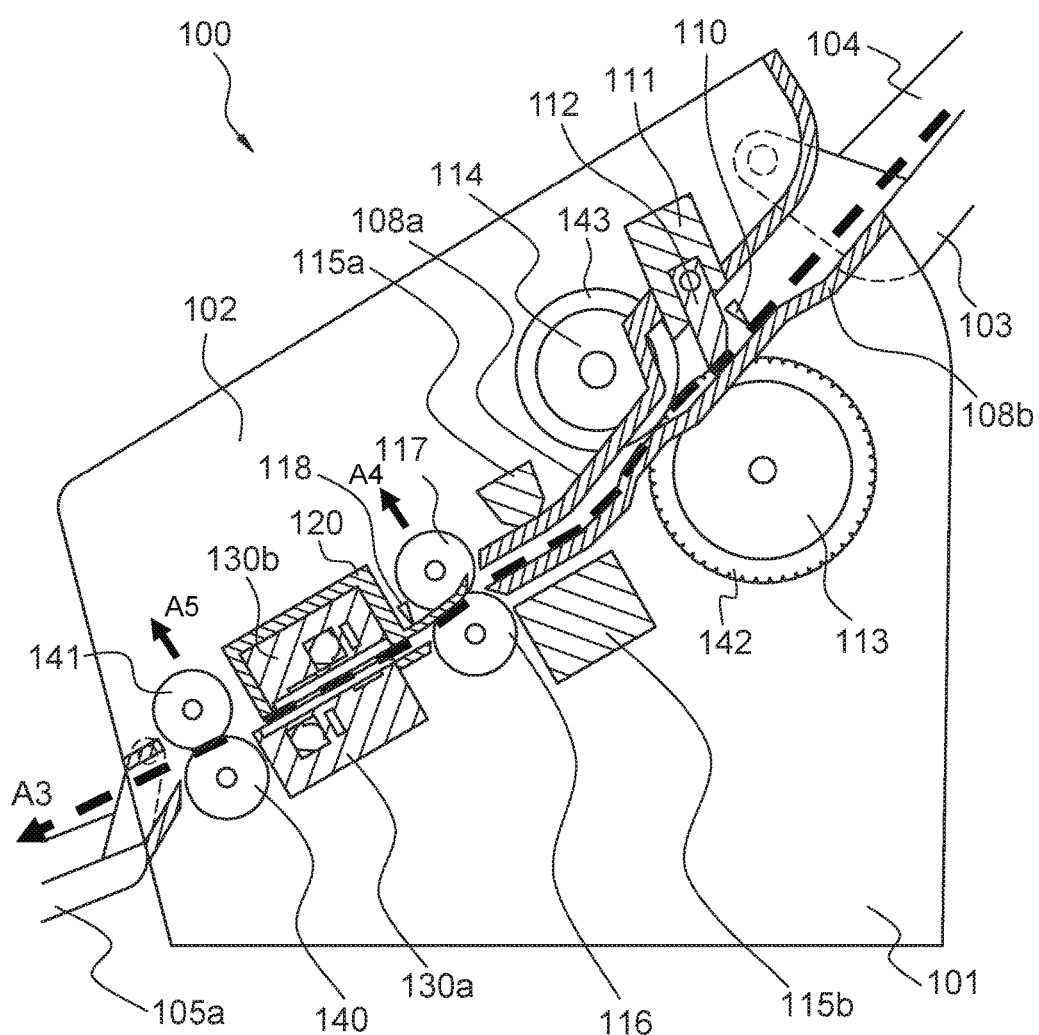
FIG. 3 is a diagram illustrating a transfer path inside the image reading apparatus 100.

FIG. 3 illustrates a conveyance path inside the image reading apparatus 100. The image reading apparatus 100 includes a first sensor 110, a pick arm 111, a flap 112, a sheet feeding roller 113, a retard roller 114, an ultrasonic wave transmitter 115a, an ultrasonic wave receiver 115b, a first conveyance roller 116, and a first driven roller 117. The image reading apparatus 100 includes a second sensor 118, an imaging unit guide 120, a first imaging unit 130a, a second imaging unit 130b, a second conveyance roller 140, a second driven roller 141, and the like.

A lower surface of the upper housing 102 forms an upper guide 108a of the document conveyance path, and an upper surface of the lower housing 101 forms a lower guide 108b of the document conveyance path. In FIG. 3, the arrow A3 indicates the conveyance direction of a document. In the following, the term "upstream" means "upstream in the conveyance direction A3", and the term "downstream" means "downstream in the conveyance direction A3".

The first sensor 110 is a contact detecting sensor, and is arranged in the upstream side of the pick arm 111, and detects whether or not a document is placed on the document tray 103. The first sensor 110 generates and outputs a first document detection signal of which signal value changes by the state whether or not a document is placed on the document tray 103.

The sheet feeding roller 113 is supported by a main body unit of the image reading apparatus 100 in a rotation-free manner. Provided in an outer circumferential surface of the sheet feeding roller 113 is a contact material 142 that contacts a document placed on the document tray 103. The contact material 142 is made of rubber, for example, of which coefficient of friction with a document is large.

The retard roller 114 is arranged to face the sheet feeding roller 113, and restricts so that a document that does not contact the sheet feeding roller 113 is not conveyed in the conveyance direction A3. The retard roller 114 is supported by the main body unit of the image reading apparatus 100 in a rotation-free manner. Provided in an outer circumferential surface of the retard roller 114 is a contact material 143 that contacts a document placed on the document tray 103. The contact material 143 is made of rubber, for example, of which coefficient of friction with a document is large.

The ultrasonic wave transmitter 115a and the ultrasonic wave receiver 115b are arranged near the document conveyance path so as to sandwich the conveyance path and face each other. The ultrasonic wave transmitter 115a transmits an ultrasonic wave. On the other hand, the ultrasonic wave receiver 115b detects an ultrasonic wave that has been transmitted by the ultrasonic wave transmitter 115a and has penetrated a document, and generates and outputs an ultrasonic wave signal that is an electrical signal depending on the detected ultrasonic wave. In the following, the ultrasonic wave transmitter 115a and the ultrasonic wave receiver 115b may be collectively referred to as an ultrasonic sensor 115.

The first conveyance roller 116 and the first driven roller 117 are respectively supported by the main body unit of the image reading apparatus 100 in a rotation-free manner. The first conveyance roller 116 and the first driven roller 117 are arranged on the upstream side of the first imaging unit 130a and the second imaging unit 130b. The first driven roller 117 is arranged above the first conveyance roller 116 to face the first conveyance roller 116. The first conveyance roller 116 is fixed, and the first driven roller 117 is arranged so as to be movable upward (in the direction of the arrow A4) relative to the first conveyance roller 116.

The second conveyance roller 140 and the second driven roller 141 are respectively supported by the main body unit of the image reading apparatus 100 in a rotation-free manner. The second conveyance roller 140 and the second driven roller 141 are arranged on the downstream side of an imaging unit 130. The second driven roller 141 is arranged above the second conveyance roller 140 to face the second conveyance roller 140. The second conveyance roller 140 is fixed, and the second driven roller 141 is arranged so as to be movable upward (in the direction of the arrow A5) relative to the second conveyance roller 140.

Figure 4:
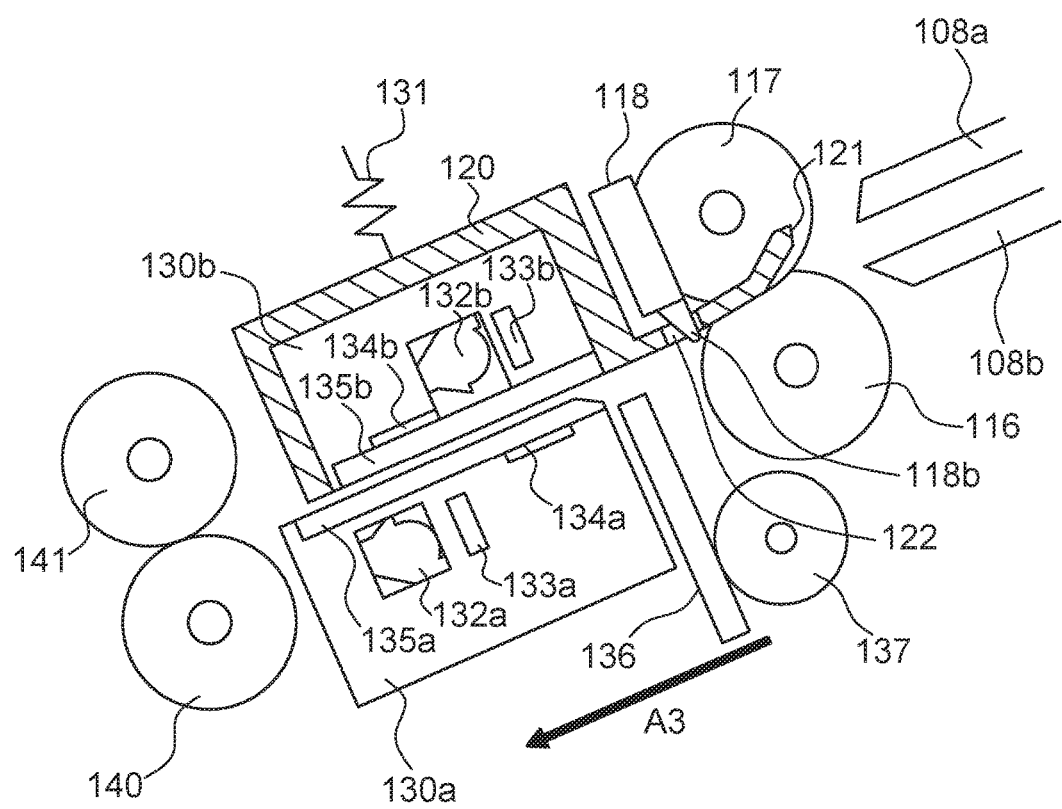
FIG. 4 is a diagram illustrating a first image capturing unit 130a etc.

FIG. 4 illustrates the first imaging unit 130a, the second imaging unit 130b, and the imaging unit guide 120. The first imaging unit 130a captures an image of a front surface of a conveyed document, and the second imaging unit 130b captures an image of a back surface of the conveyed document. The second imaging unit 130b is arranged above the first imaging unit 130a to face the first imaging unit 130a. The second imaging unit 130b includes the imaging unit guide 120 for guiding a document between the first imaging unit 130a and the second imaging unit 130b. In the following, the first imaging unit 130a and the second imaging unit 130b may be collectively referred to as the imaging unit 130.

The first imaging unit 130a is fixed to the lower housing 101. On the other hand, the second imaging unit 130b is supported by the upper housing 102 so as to be movable in the direction perpendicular to the conveyance path. The second imaging unit 130b includes a pushing spring 131 at an upper position thereof. The pushing spring 131 pushes the second imaging unit 130b toward the first imaging unit 130a. When there is no document at the conveyance path, pushing force of the pushing spring 131 returns the second imaging unit 130b back to an initial position. In other words, the second imaging unit 130b is provided to be able to move between an initial position facing the first imaging unit 130a and a position facing the first imaging unit 130a and more separated from the first imaging unit 130a than the initial position. The initial position of the second image capturing unit 130b will sometimes be referred to as a first position, and a position distant from the first image capturing unit 130a will sometimes be referred to as a second position hereinafter.

When the second imaging unit 130b is at the first position, a width of a gap between the first imaging unit 130a and the second imaging unit 130b facing each other is larger than the thicknesses of a copy paper sheet, a print paper sheet, a photo paper sheet, and the like. For this reason, the second imaging unit 130b does not move from the initial position after any of these sheets are conveyed.

The first imaging unit 130a includes a first light source 132a, a first image capturing device 133a, a first reference member 134a, a first glass surface 135a, and the like. The second imaging unit 130b includes a second light source 132b, a second image capturing device 133b, a second reference member 134b, a second glass surface 135b, and the like. In the following, the first image capturing device 133a and the second image capturing device 133b may be collectively referred to as an image capturing device 133. The first reference member 134a and the second reference member 134b may be collectively referred to as a reference member 134.

The first light source 132a includes light emitting diodes (LEDs) of respective colors RGB and a light guiding material, and emits an illuminating light to a document surface. When there is no document at an illuminating position, the second reference member 134b of the second imaging unit 130b is irradiated with illuminating light. Similarly, the second light source 132b includes LEDs of respective colors RGB and a light guiding material, and emits an illuminating light to a document surface. When there is no document at an illuminating position, the first reference member 134a of the first imaging unit 130a is irradiated with illuminating light.

The first image capturing device 133a and the second image capturing device 133b are an example of an image capturing module. The first image capturing device 133a includes a contact image sensor (CIS) that is a unit-magnification optical system that includes an imaging element constituted by charge coupled devices (CCDs) that are linearly arranged in a main scanning direction. The first image capturing device 133a reads a front surface of a document to generate and output an image signal. The second image capturing device 133b includes a CIS that is a unit-magnification optical system that includes an imaging element constituted by CCDs that are linearly arranged in a main scanning direction. Alternatively, instead of the CCDs, complementary metal oxide semiconductors (CMOSs) may be used. Further, alternatively, instead of the CIS, an image sensor that is an optical reduction system can be used.

The first reference member 134a is a white reference plate, and is arranged at a position facing the second image capturing device 133b. When a document is not conveyed to the imaging unit 130, the second image capturing device 133b captures an image of the first reference member 134a to generate an image signal. Similarly, the second reference member 134b is arranged at a position facing the first image capturing device 133a of the first imaging unit 130a. When a document is not conveyed to the imaging unit 130, the first image capturing device 133a captures an image of the second reference member 134b to generate an image signal. On the basis of the image signals generated by capturing the images of the first reference member 134a and the second reference member 134b, the image reading apparatus 100 can perform image correction such as shading, and the like.

Provided at the imaging unit guide 120 is a guide member 121 that guides a document to a position between the first imaging unit 130a and the second imaging unit 130b. The second sensor 118 is provided above the guide member 121. A lever portion 118b of the second sensor 118 penetrates a penetration hole 122 provided in the guide member 121 to contact a document on the conveyance path.

Either the first imaging unit 130a or the second imaging unit 130b may be omitted. In this case, in place of the omitted imaging unit, a transfer roller functioning as the reference member may be provided.

An arm 136 is accommodated in the lower housing 101 to face the imaging unit guide 120 across the document transfer path. The arm 136 is placed at the central position of the document transfer path in a direction (main scanning direction) perpendicular to the document transfer direction. Placing the arm 136 at the central position in the direction perpendicular to the document transfer direction allows stable movement of the second imaging unit 130b even with only one member. When a document exists in the document transfer path, the arm 136 may be placed at one or two ends of the document transfer path in the direction perpendicular to the document transfer direction not to come into contact with the document. The arm 136 engages with a gear 137.

Figure 5:
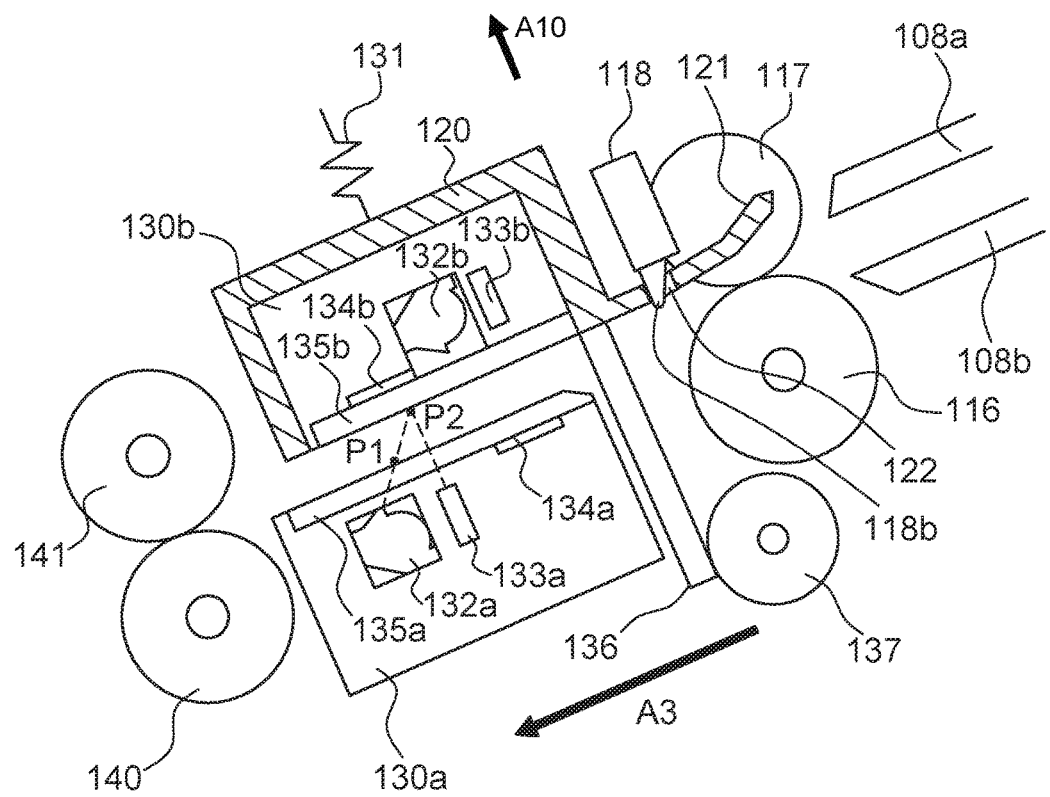
FIG. 5 is a diagram illustrating an operation of a second image capturing unit 130b.

FIG. 5 is a diagram illustrating an operation of the second imaging unit 130b during movement of the arm 136.

As illustrated in FIG. 5, when the gear 137 rotates by a motor, the arm 136 slides perpendicularly to the document transfer path upon rotation of the gear 137, comes into contact with the imaging unit guide 120, and pushes up the imaging unit guide 120 and the second imaging unit 130b to the second position. When the motor stops driving for the gear 137, the imaging unit guide 120 and the second imaging unit 130b restore to their initial position by the biasing force of the pushing spring 131. In other words, the motor moves the second imaging unit 130b between the first position and the second position.

Figure 6:
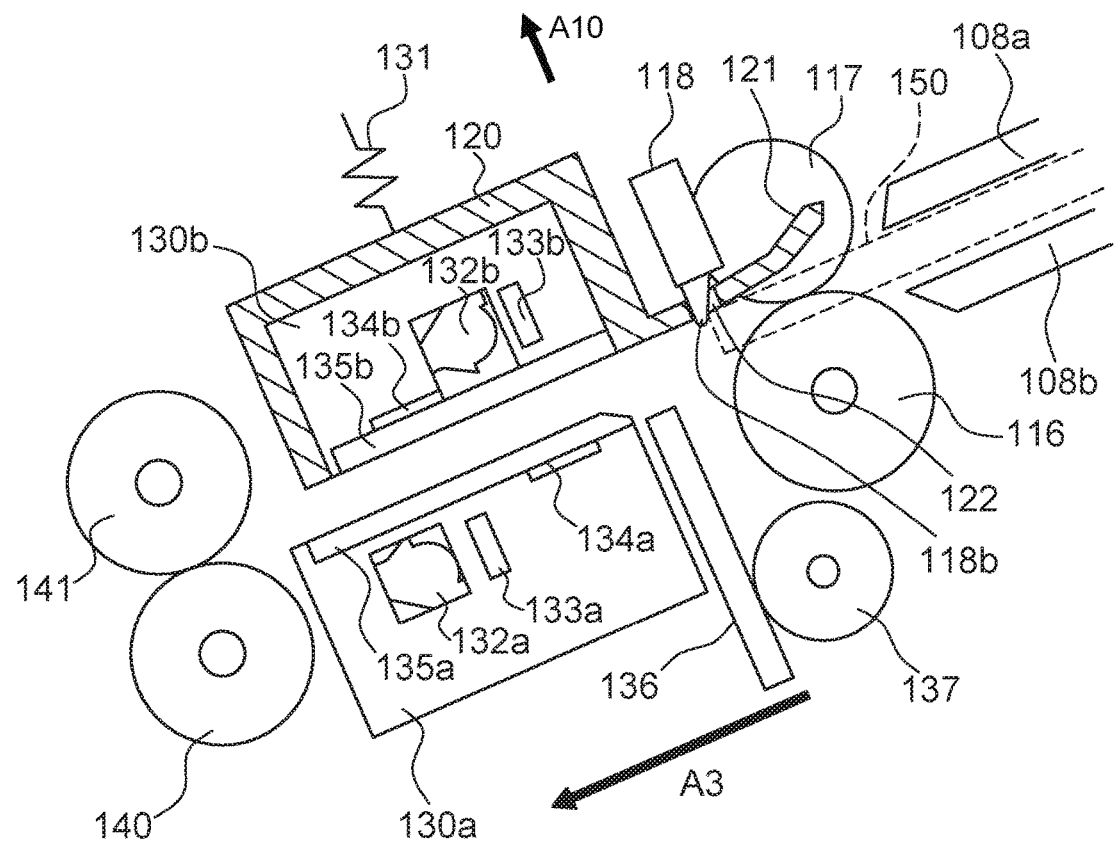
FIG. 6 is a diagram illustrating another operation of the second image capturing unit 130b.

FIG. 6 is a diagram illustrating an operation of the second imaging unit 130b at the timing of document transfer. An example illustrated in FIG. 6 assumes that a thick medium, such as cardboard, banking card, or credit card, thicker than copy paper, print paper, or photo paper is transferred as a document 150.

When a document 150 in the form of a thick medium is transferred to the position of the imaging unit guide 120, the document 150 having a certain strength comes into contact with a guide member 121. This moves the imaging unit guide 120 and the second imaging unit 130b in a direction away from the transfer path, as indicated by an arrow A10. In this manner, even when the motor that rotates the gear 137 is inactive, the second imaging unit 130b is provided to be movable by the document transferred to the image reading apparatus 100. In contrast to this, even when a document 150 in the form of a thin medium such as copy paper, print paper, or photo paper is transferred to the position of the imaging unit guide 120, the second imaging unit 130b remains still at the first position.

The document 150 in contact with the guide member 121 further comes into contact with the lever portion 118b of the second sensor 118 that passes through the penetration hole 122 of the guide member 121. As a result, the second sensor 118 detects that the document 150 exists at the position of the lever portion 118b. The second sensor 118 generates and outputs a second document detection signal having a first value when the lever portion 118b is not in contact with the document 150 and a second value when the lever portion 118b is in contact with the document 150.

The above-described embodied example is configured such that the second imaging unit 130b provided above the transfer path moves, but modification may be made such that the first imaging unit 130a provided below the transfer path moves.

Figure 7:
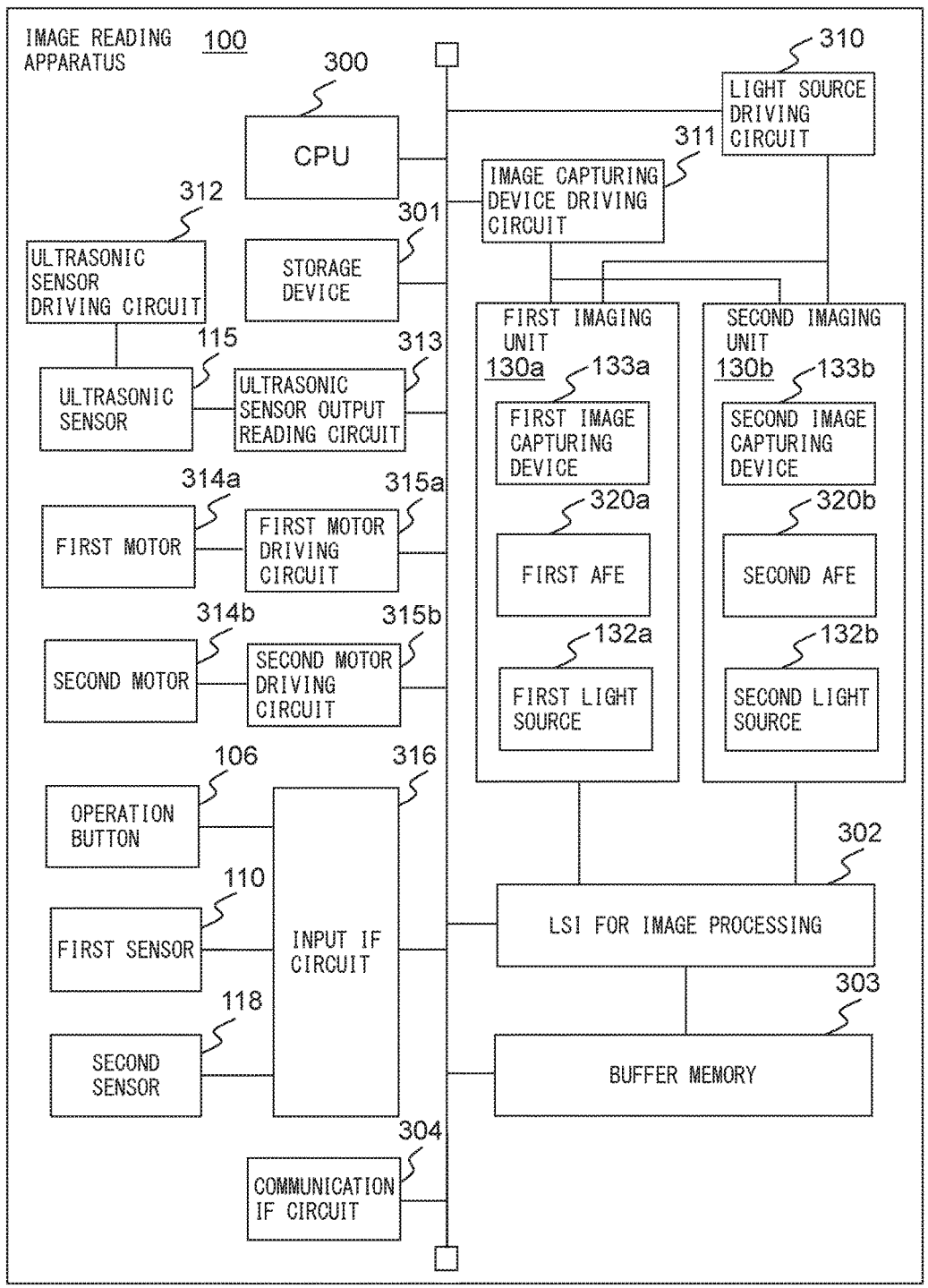
FIG. 7 is a diagram illustrating one example of a hardware configuration of the image reading apparatus 100.

FIG. 7 illustrates one example of a hardware configuration of the image reading apparatus 100. The image reading apparatus 100 includes a central processing unit (CPU) 300, a storage device 301, a large scale integration (LSI) 302 for image processing, a buffer memory 303, and a communication interface circuit 304 as well as the above-described configuration. In the attached drawings and the following description, an interface may be referred to as an IF.

Moreover, the image reading apparatus 100 includes a light source drive circuit 310, an image capturing module drive circuit 311, an ultrasonic sensor drive circuit 312, an ultrasonic sensor output reading circuit 313, a first motor 314a, a second motor 314b, a first motor drive circuit 315a, a second motor drive circuit 315b, and an input IF circuit 316. The first imaging unit 130a and the second imaging unit 130b include a first analogue front-end processor (AFE) 320a and a second AFE 320b, respectively.

The CPU 300 controls an operation of the image reading apparatus 100 in accordance with a computer program stored in the memory 301. Furthermore, the CPU 300 may perform a part of or all of image processing for an image read by the image reading apparatus 100. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 300.

The storage device 301 includes memory devices such as a RAM (Random Access Memory), a ROM (Read Only Memory), etc., a fixed disk device such as a hard disk, or a portable storage device such as a flexible disk, an optical disk, etc. The storage device 301 stores computer programs, databases, tables, etc., used for various kinds of processing of the image reading apparatus 100. The computer program may be installed on the storage device 301 from a computer-readable, non-transitory medium such as a compact disk read only memory (CD-ROM), a digital versatile disk read only memory (DVD-ROM), or the like by using a well-known setup program or the like. Further, the storage device 301 stores the read images.

The first AFE 320a and the second AFE 320b convert analogue image signals into digital signals to generate digital image data, the analogue image signals being output from the first image capturing device 133a of the first imaging unit 130a and the second image capturing device 133b of the second imaging unit 130b. The first AFE 320a and the second AFE 320b output the image data to the LSI 320 for image processing.

The LSI 302 for image processing performs predetermined image processing on the image data received from the imaging unit 130. The LSI 302 for image processing stores such image data in the buffer memory 303 as the image processing is performed. Alternatively, a DSP, an ASIC, or an FPGA, etc., may be used instead of the LSI 302 for image processing.

The communication IF circuit 304 is a wired or wireless communication interface between the image reading apparatus 100 and the information processing apparatus 10. The CPU 300 reads the image date from the buffer memory 303 to transmit the image data to the information processing apparatus 10 via the communication IF circuit 304.

The light source drive circuit 310 drives the first light source 132a of the first imaging unit 130a and the second light source 132b of the second imaging unit 130b in accordance with the control performed by the CPU 300. The image sensor drive circuit 311 drives the first image capturing device 133a of the first imaging unit 130a and the second image capturing device 133b of the second imaging unit 130b in accordance with the control performed by the CPU 300.

The ultrasonic sensor drive circuit 312 drives the ultrasonic wave transmitter 115a to cause the ultrasonic wave to be transmitted. The ultrasonic sensor output reading circuit 313 reads an output signal of the ultrasonic wave receiver 115b to transmit the output signal to the CPU 300 via a bus.

The first motor 314a applies a rotational driving force to the sheet feeding roller 113, the retard roller 114, the first conveyance roller 116, and the second conveyance roller 140. A plurality of first motors 314a may be used. The first motor drive circuit 315a generates a driving current to be supplied to the first motor 314a under the control of the CPU 300. The second motor 314b is one example of a driving device and applies a rotational driving force to the gear 137. The second motor drive circuit 315b generates a driving current to be supplied to the second motor 314b under the control of the CPU 300. By providing the second motor 314b separately from the first motor 314a, the image reading apparatus 100 can independently execute rotation control of each roller and movement control of the second imaging unit 130b via the gear 137 to simplify each type of processing.

The input IF circuit 316 receives an operation detection signal output by the operation button 106, a first document detection signal output by the first sensor 110, and a second document detection signal output by the second sensor 118 to transmit the signals to the CPU 300 via the bus.

The hardware configuration illustrated in FIG. 7 is merely an example for explanation of the embodied example. The image reading apparatus 100 may include any other hardware configurations as long as the operation described in the following may be performed.

Figure 8:
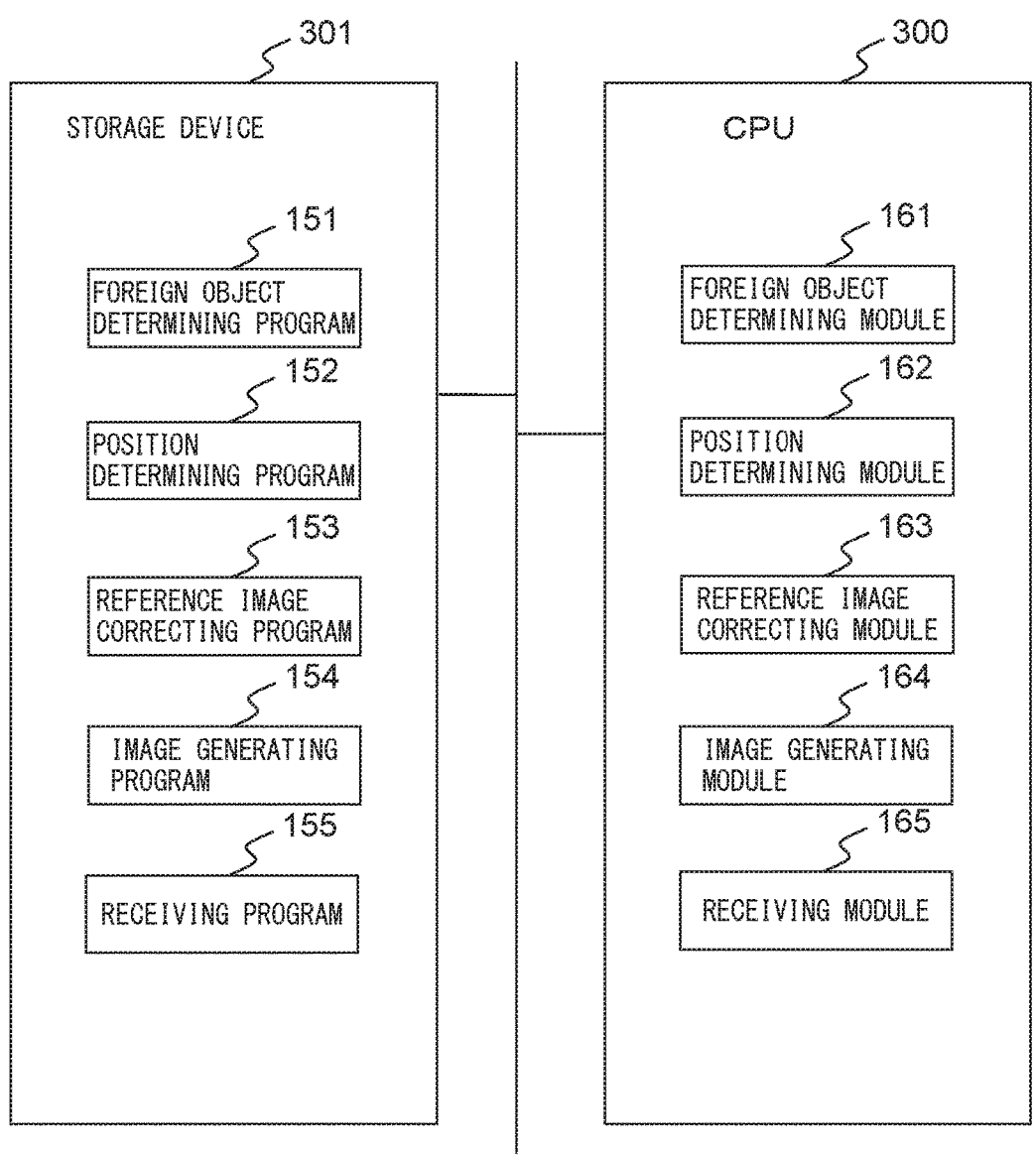
FIG. 8 is a diagram representing a schematic configuration of a storage device 301 and a CPU 300.

FIG. 8 is a diagram illustrating a schematic configuration of the storage device 301 and the CPU 300.

As illustrated in FIG. 8, the storage device 301 stores programs including a foreign object determining program 151, a position determining program 152, a reference image correcting program 153, an image generating program 154, and a receiving program 155. Each of these programs is a function module implemented by software operating on a processor. The CPU 300 reads the respective programs stored in the storage device 301, and operates in accordance with the respective read programs to thereby function as a foreign object determining module 161, a position determining module 162, a reference image correcting module 163, an image generating module 164, and a receiving module 165.

Figure 9:
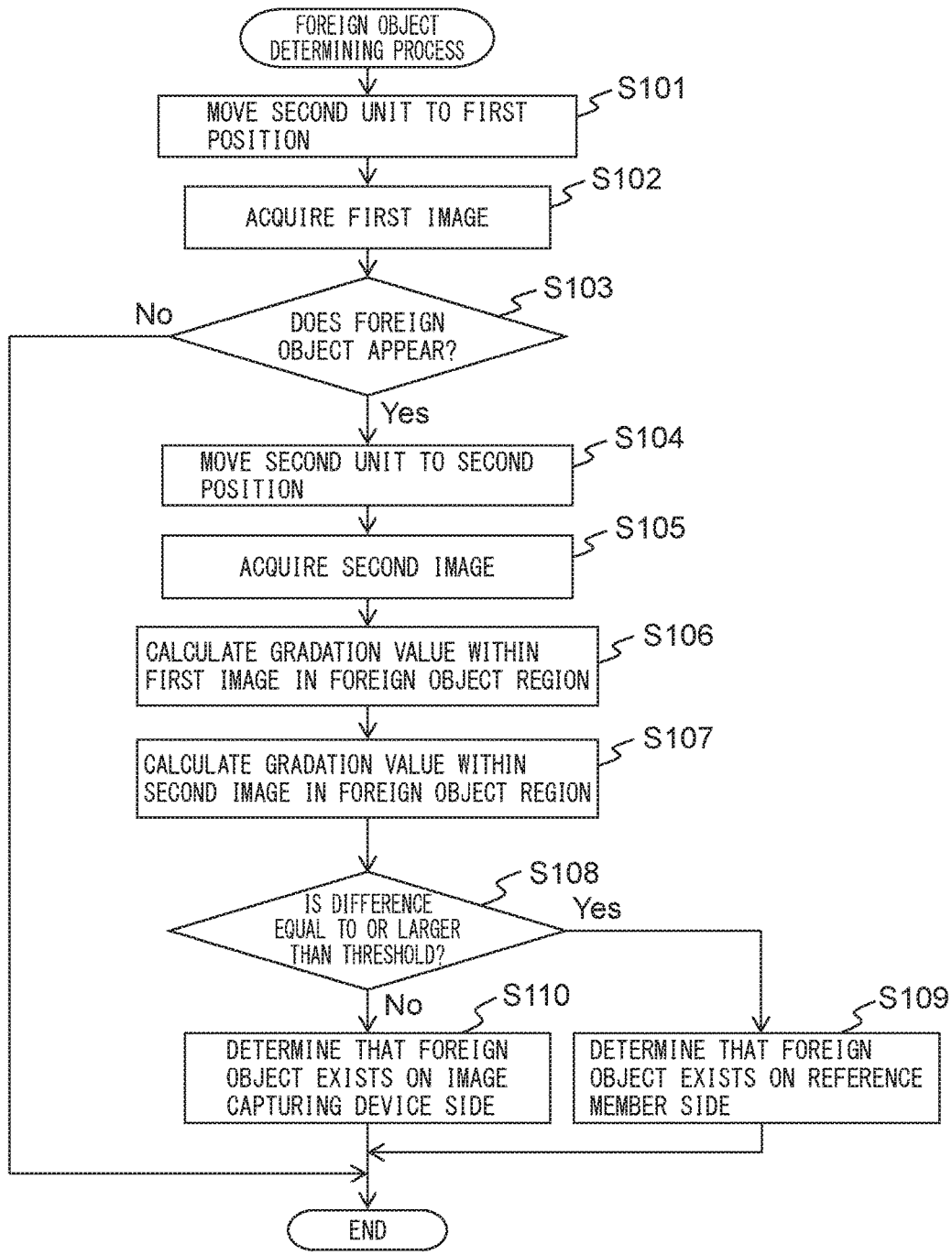
FIG. 9 is a flowchart representing an operational example of a foreign object determining process.

FIG. 9 is a flowchart representing an operational example of a foreign object determining process of the image reading apparatus 100.

Referring to the flowchart of FIG. 9, the following describes the operational example of the foreign object determining process of the image reading apparatus 100. The flow of the operation described below is performed mainly by the CPU 300 based on the programs previously stored in the storage device 301, cooperating with the respective elements of the image reading apparatus 100. The flow of the operation illustrated in FIG. 9 is performed, for example, at the timing of staring up the device, the timing of closing the opened front surface cover 105a, or the timing of starting communication connection with the information processing device 10. The flow of the operation illustrated in FIG. 9 may also be performed periodically or in accordance with an instruction from the user, at an arbitrary timing when the document reading process is not being performed.

First, the foreign object determining module 161 drives the second motor 314b via the second motor drive circuit 315b to move the second imaging unit 130b to the first position (step S101). When the second imaging unit 130b has already been set at the first position, the process in step S101 may be omitted.

Next, the foreign object determining module 161 drives the image capturing device drive circuit 311 and causes the first image capturing device 133a and the second image capturing device 133b to capture first images to acquire each first image (step S102). In other words, the first image captured by the first image capturing device 133a is an image of the second reference member 134b captured when the second imaging unit 130b is provided at the first position. The first image captured by the second image capturing device 133b is an image of the first reference member 134a captured when the second imaging unit 130b is provided at the first position.

Next, the foreign object determining module 161 determines whether a foreign object such as paper powder, dust, or paste appears in each of the first images captured by the first image capturing device 133a and the second image capturing device 133b (step S103). For each of all the pixels in the first images, for example, the foreign object determining module 161 determines whether or not the pixel has a gradation value within a predetermined range. When the pixel having gradation value outside the predetermined range exists, the foreign object determining module 161 determines that a foreign object appears in this pixel, i.e., a foreign object appears in the first image. On the other hand, when no pixels have a gradation value outside the predetermined range, the foreign object determining module 161 determines that no foreign objects appear in the first images.

A region where a foreign object appears in the image used by the foreign object determining module 161 for the determination, i.e., a region of pixels having gradation values outside the predetermined range is sometimes called a foreign object region in the following. The foreign object region is not limited to a region of pixels having gradation values outside the predetermined range, and may be a region whose center is a pixel (pixel whose gradation value is the peak value) having a gradation value most distant from the predetermined range and that is constituted by pixels within a predetermined distance from the pixel of this center. The predetermined range is determined, for example, to be a range that has a predetermined width (e.g., 10) and whose center is an average of gradation values of all the pixels included in the captured image of the second reference member 134b or the first reference member 134a in the foregoing experiment. Alternatively, the predetermined range may be determined to be a range that has a predetermined width and whose center is an average of gradation values of all the pixels included in the image used by the foreign object determining module 161 for the determination.

When no foreign object appears in the first images, the foreign object determining module 161 terminates a series of the steps.

When the foreign object appears in the first image, the position determining module 162 drives the second motor 314b via the second motor drive circuit 315b to move the second imaging unit 130b to the second position (step S104).

Next, the foreign object determining module 161 drives the image capturing module drive circuit 311 to cause one or both of the first image capturing device 133a and the second image capturing device 133b to capture and acquire the second image (step S105). When a foreign object appears in the first image captured by the first image capturing device 133a, the position determining module 162 causes the first image capturing device 133a to capture the second image. When a foreign object appears in the first image captured by the second image capturing device 133b, the position determining module 162 causes the second image capturing device 133b to capture the second image. The second image captured by the first image capturing device 133a is an image of the second reference member 134b captured when the second imaging unit 130b is provided at the second position. The second image captured by the second image capturing device 133b is an image of the first reference member 134a captured when the second imaging unit 130b is provided at the second position.

The positions of the second imaging unit 130b corresponding to the first image and the second image are not limited to the above-mentioned example, and an image captured when the second imaging unit 130b is provided at the second position may be defined as a first image, and an image captured when the second imaging unit 130b is provided at the first position may be defined as a second image.

Next, the position determining module 162 calculates a gradation value in the foreign object region within the first image (step S106). The position determining module 162 calculates, for example, the average of gradation values for respective pixels included in the foreign object region within the first image. The gradation value calculated by the position determining module 162 may be any representative value of gradation values in the first image, and may be a median, for example.

Next, the position determining module 162 calculates a gradation value of a region included in the second image and corresponding to the foreign object region (step S107). For example, the position determining module 162 calculates an average of gradation values of respective pixels included in the captured second image and positioned at the same coordinates as respective coordinates in the foreign object region in the reference image. The gradation value calculated by the position determining module 162 may be any representative value of gradation values in the second image, and may be a median, for example.

Next, the position determining module 162 determines whether or not an absolute value of a difference between the calculated gradation value in the foreign object region within the first image and the gradation value of the region corresponding to the foreign object region within the second image is equal to or larger than a threshold (step S108). The predetermined threshold is determined, for example by foregoing experiment, to be an average of two averages, one of the two average being an average of an absolute value of a difference between the gradation values calculated when a foreign object is attached to the first glass surface 135a, the other of the two average being an average of an absolute value of a difference between the gradation values calculated when a foreign object is attached to the second glass surface 135b.

When the absolute value of the difference between the respective gradation values is equal to or larger than the predetermined threshold, the position determining module 162 determines that the foreign object exists on the image capturing device side (step S109), and terminates a series of the steps. When the foreign object exists in the first image captured by the first image capturing device 133a, the position determining module 162 determines that the foreign object exists on the second image capturing device 133b side, i.e., on the second glass surface 135b of the second imaging unit 130b. On the other hand, when the foreign object exists in the first image captured by the second image capturing device 133b, the position determining module 162 determines that the foreign object exists on the first image capturing device 133a side, i.e., on the first glass surface 135a of the first imaging unit 130a.

On the other hand, when the absolute value of the difference between the respective gradation values is smaller than the predetermined threshold, the position determining module 162 determines that the foreign object exists on the reference member side (step S110), and terminates a series of the steps. When the foreign object exists in the first image captured by the first image capturing device 133a, the position determining module 162 determines that the foreign object exists on the first reference member 134a side, i.e., on the first glass surface 135a of the first imaging unit 130a. On the other hand, when the foreign object exists in the first image captured by the second image capturing device 133b, the position determining module 162 determines that the foreign object exists on the second reference member 134b side, i.e., on the second glass surface 135b of the second imaging unit 130b.

At the step S108, the position determining module 162 determines whether or not the absolute value of the difference between the respective gradation values is equal to or larger than the predetermined threshold, for each of a red component, a green component, and a blue component in the first image and the second image. When the absolute value of the difference is equal to or larger than the predetermined threshold for any one of the components, the position determining module 162 determines that the foreign object exists on the image capturing device side, and when the absolute value of the difference is smaller than the predetermined threshold for all of the components, the position determining module 162 determines that the foreign object exists on the reference member side. When the absolute value of the difference is equal to or larger than the predetermined threshold for all of the components, the position determining module 162 may determine that the foreign object exists on the reference member side, and when the absolute value of the difference is smaller than the predetermined threshold for any one of the components, the position determining module 162 may determine that the foreign object exists on the image capturing device side.

The receiving module 165 receives via the input IF circuit 316 the setting that has been set by a user via the operation button 106 and that indicates which of a single color and a plurality of colors is used to capture an image of a document. When the receiving module 165 receives the setting that indicates that a plurality of colors is used to capture an image of a document, the position determining module 162 determines whether or not the absolute value of the difference between the gradation values is equal to or larger than the predetermined threshold, for each of the red component, the green component, and the blue component. On the other hand, when the receiving module 165 receives the setting that indicates that a single color is used to capture an image of a document, the position determining module 162 may determine whether or not the absolute value of the difference between the gradation values is equal to or larger than the predetermined threshold, for one of the red component, the green component, or the blue component. In this case, when the absolute value of the difference between the gradation values is equal to or larger than the predetermined threshold for the one color component, the position determining module 162 determines that the foreign object exists on the reference member side, and when the absolute value of the difference is smaller than the predetermined threshold, the position determining module 162 determines that the foreign object exists on the image capturing device side. With these processes, a position where the foreign object exists can be accurately determined, and a process load can be reduced when a single color is used to capture an image of a document.

In this manner, the position determining module 162 determines whether a position of the foreign object is on the image capturing device side or on the reference member side, based on the absolute value of the difference between the gradation value of the region within the first image and the gradation value of the region corresponding to the foreign object region within the second image.

The following describes the reason why comparing gradation values of two images of the reference member captured at different distances between the image capturing device and the reference member enables determination of whether a foreign object exists on the image capturing device side or on the reference member side.

FIGS. 10A to 10D are graphs expressing first images and second images.

In FIGS. 10A to 10D, the horizontal axes indicate horizontal coordinates of each image, and the vertical axes indicate gradation values. The first images and second images to be described with reference to FIGS. 10A to 10D are horizontal one-line images. Since a foreign object appears in the same manner in an image captured by either one of the first image capturing device 133a or the second image capturing device 133b, the images captured by the first image capturing device 133a are expressed as representatives in FIGS. 10A to 10D.

Figure 10A:
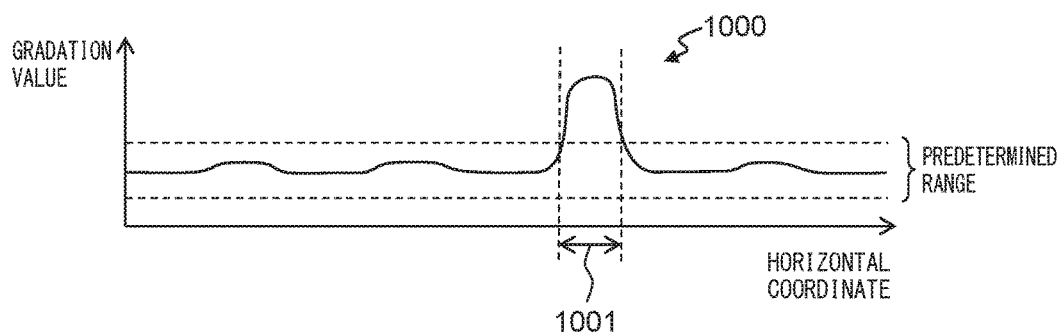
FIG. 10A is a graph expressing a first image.

A graph 1000 in FIG. 10A indicates one example of a first image when a foreign object is attached to the second glass surface 135b of the second imaging unit 130b. As illustrated in FIG. 10A, since the second reference member 134b appears in each pixel where the foreign object does not appear within the first image, the change in gradation value is small, and each gradation value stays within a predetermined range. In a foreign object region 1001 where the foreign object appears, the change in gradation value is large, and each gradation value deviates from the predetermined range.

Figure 10B:
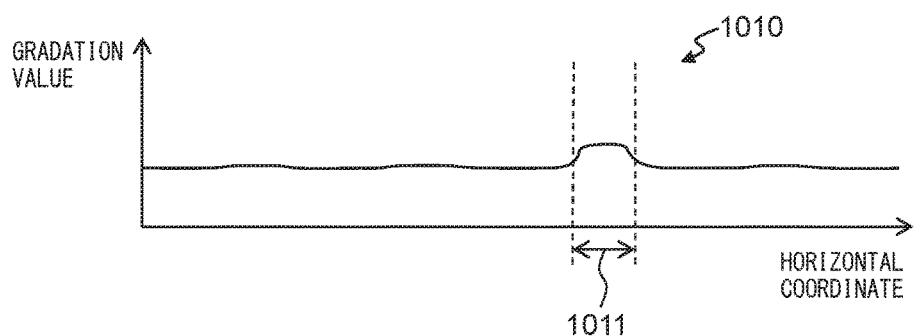
FIG. 10B is a graph expressing a second image.

A graph 1010 in FIG. 10B indicates one example of a second image when a foreign object is attached to the second glass surface 135b of the second imaging unit 130b. In this case, the second imaging unit 130b moves to the second position so that the foreign object attached to the second glass surface 135b moves away from the first image capturing device 133a. Therefore, the foreign object blurs in the second image, and the gradation value of a region 1011 included corresponding to the foreign object region 1001 within the second image is considerably different from the gradation value in the foreign object region 1001 within the first image.

Figure 10C:
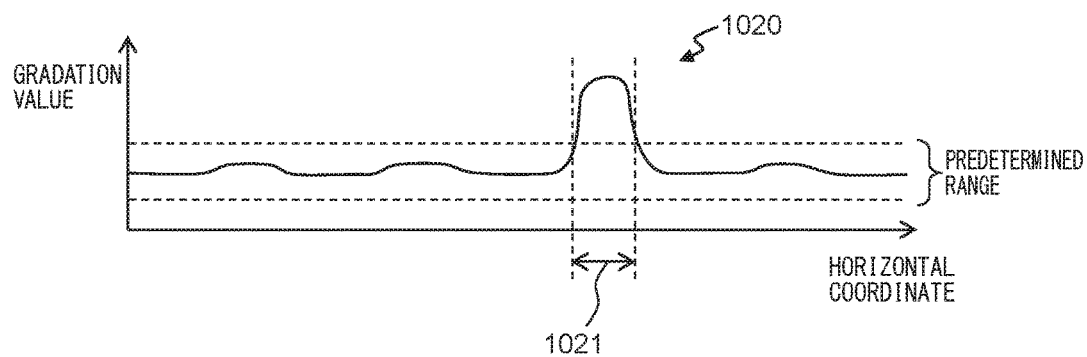
FIG. 10C is a graph expressing a first image.

A graph 1020 in FIG. 10C indicates one example of a first image when a foreign object is attached to the first glass surface 135a of the first imaging unit 130a. In the first image illustrated in FIG. 10C, as well as the first image illustrated in FIG. 10A, in a foreign object region 1021 where the foreign object appears, the change in gradation value is large, and each gradation value deviates from the predetermined range.

Figure 10D:
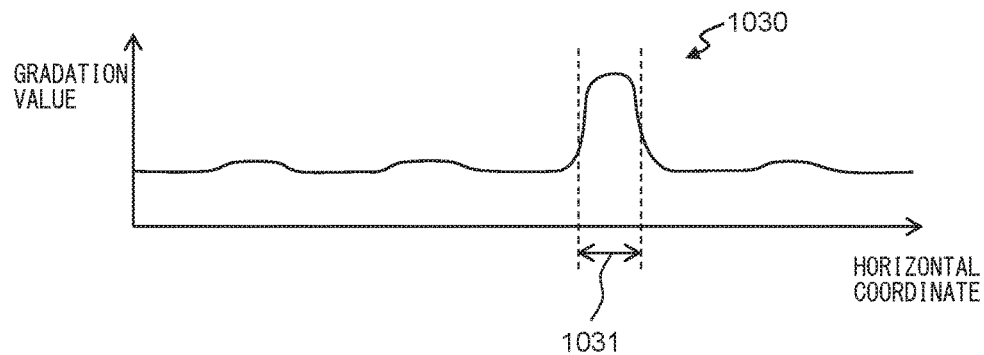
FIG. 10D is a graph expressing a second image.

A graph 1030 in FIG. 10D indicates one example of a second image when a foreign object is attached to the first glass surface 135a of the first imaging unit 130a. In this case, the second imaging unit 130b moves to the second position, but the distance between the first image capturing device 133a and the foreign object attached to the first glass surface 135a remains the same. Therefore, the gradation value of a region 1031 corresponding to the foreign object region 1021 within the second image varies less than the gradation value in the foreign object region 1021 within the first image.

Thus, the position determining module 162 can determine whether the foreign object exists on the image capturing device side or on the reference member side with high accuracy, by comparing gradation values in the foreign object region within the first image, with gradation values in the region corresponding to the foreign object region within the second image.

Figure 11:
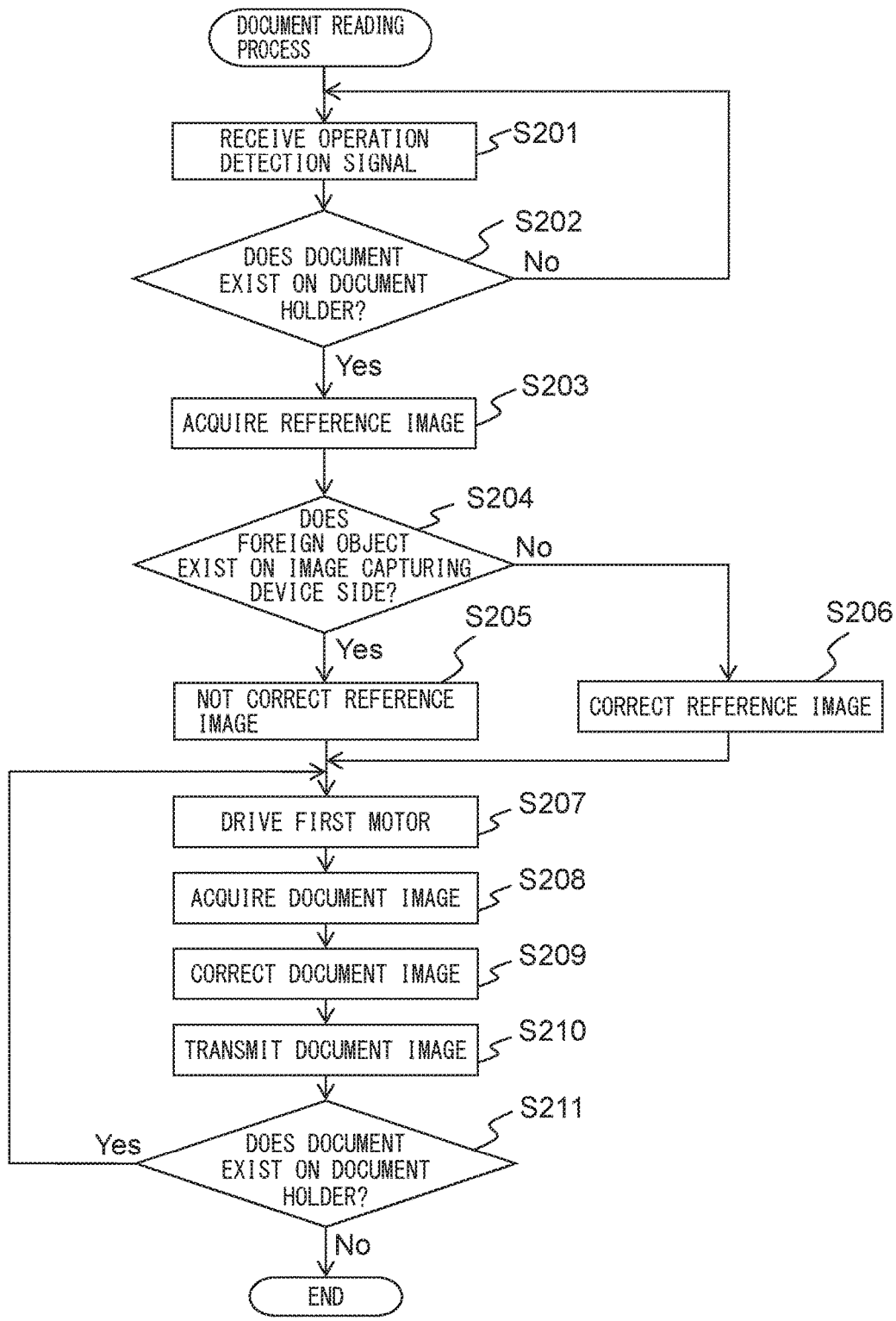
FIG. 11 is a flowchart representing an operational example of a document reading process.

FIG. 11 is a flowchart representing an operational example of a document reading process of the image reading apparatus 100.

Referring to the flowchart of FIG. 11, the following describes the operational example of the document reading process of the image reading apparatus 100. The flow of the operation described below is performed mainly by the CPU 300 based on the programs previously stored in the storage device 301, cooperating with the respective elements of the image reading apparatus 100.

First, the CPU 300 waits until a user presses down the operation button 106 for commanding reading of a document, and the CPU 300 receives from the operation button 106 an operation detection signal that commands reading of a document (step S201).

Next, the CPU 300 determines whether or not a document is placed on the document tray 103, based on a first document detection signal received from the first sensor 110 (step S202).

When a document is not placed on the document tray 103, the CPU 300 returns the process to the step S201, and waits until the CPU 300 receives the operation detection signal from the operation button 106 again.

When a document is mounted on the document tray 103, the reference image correcting module 163 causes the first image capturing device 133a and the second image capturing device 133b to capture reference images of the second reference member 134b and the first reference member 134a, respectively. The reference image correcting module 163 acquires the reference images from the first image capturing device 133a and the second image capturing device 133b via the first AFE 320a and the second AFE 320b (step S203). These reference images are used to correct a document image acquired by capturing an image of the document.

The reference image correcting module 163 determines whether a foreign object has been determined to exist on either one of the sides of the first image capturing device 133a or the second image capturing device 133b in the foreign object determining process (step S204).

When no foreign object exists, or when a foreign object exists, but it is on the side of an image capturing device, the reference image correcting module 163 does not correct the reference image captured by the image capturing device (step S205). When the foreign object exists on the image capturing device side, there is a high possibility that the foreign object appears at a position corresponding to the foreign object region in both of the reference image captured by this image capturing device and a document image subsequently captured. Thus, performing the shading correction using the reference image where the foreign object appears at the position corresponding to the foreign object region as it is enables removal of the foreign object appearing in the document image, and suppression of vertical stripe noise generation in the document image caused by the foreign object.

When a foreign object exists, and it is on the side of a reference member facing an image capturing device, the reference image correcting module 163 corrects the reference image captured by the image capturing device (step S206). The reference image correcting module 163 corrects the reference image by, for example, replacing each of gradation values of respective pixels included in the foreign object region within the reference image, with an average of gradation values of respective pixels included in a region neighboring this foreign object region and having a predetermined width. When the foreign object exists on the reference member side facing the image capturing device, there is a high possibility that the foreign object appears in the reference image captured by this image capturing device and at the position corresponding to the foreign object region. However, since a document exists between this image capturing device and the foreign object at the time of next capturing of a document image, there is a high possibility that the foreign object does not appear in the document image. Thus, the shading correction is performed using the reference image from which the foreign object has been removed. Thereby, the document image can be appropriately corrected.

When the position determining module 162 determines in step S108 whether the absolute value of the difference between the respective gradation values is equal to or larger than a threshold for each of red, green, and blue components, the reference image correcting module 163 may correct the reference image for each color component. In this case, the reference image correcting module 163 corrects only a color component for which the absolute value of the difference between the respective gradation values is determined to be equal to or larger than the threshold in the reference image. With this operation, the reference image correcting module 163 can correct only a component affected by the foreign object in the reference image and therefore perform shading correction more appropriately.

Next, the image generating module 164 drives the first motor 314a via the first motor drive circuit 315a, to rotate the sheet feeding roller 113, the retard roller 114, the first conveyance roller 116, and the second conveyance roller 140 and to transfer a document (step S207).

The image generating module 164 causes the first image capturing device 133a and the second image capturing device 133b to capture respective surfaces of the transferred document to acquire document images. The reference image correcting module 163 then receives the document images from the first image capturing device 133a and the second image capturing device 133b via the first AFE 320a and the second AFE 320b (step S208).

Next, the image generating module 164 executes shading correction on the respective document images, using the respective reference images (step S209).

Next, the image generating module 164 transmits the corrected document images to the information processing device 10 via the communication IF circuit 304 (step S210).

Next, the CPU 300 determines whether a document still exists on the document tray 103, based on a first document detection signal received from the first sensor 110 (step S211).

When the document still exists on the document tray 103, the CPU 300 returns the process to the step S207, and repeats the processes of the steps S207 to S211. The CPU 300 may return the process to step S203, in which it may acquire another reference image every time one document is transferred. On the other hand, when a document does not exist on the document tray 103, the CPU 300 terminates a series of the processes.

As described in detail above, the image reading apparatus 100 operates in accordance with the flowcharts illustrated in FIGS. 9 and 11, to determine an existing position of a foreign object by comparing gradation values of two captured images of the reference member at different distances between the image capturing device and the reference member. Thus, the image reading apparatus 100 can accurately determine the existing position of the foreign object. This enables the image reading apparatus 100 to appropriately determine whether or not to correct the reference image used in the shading correction, and enables the image reading apparatus 100 to generate an appropriate reference image. Therefore, the image reading apparatus 100 can suppress generation of vertical stripe noise in a document image caused by a foreign object.

Figure 12:
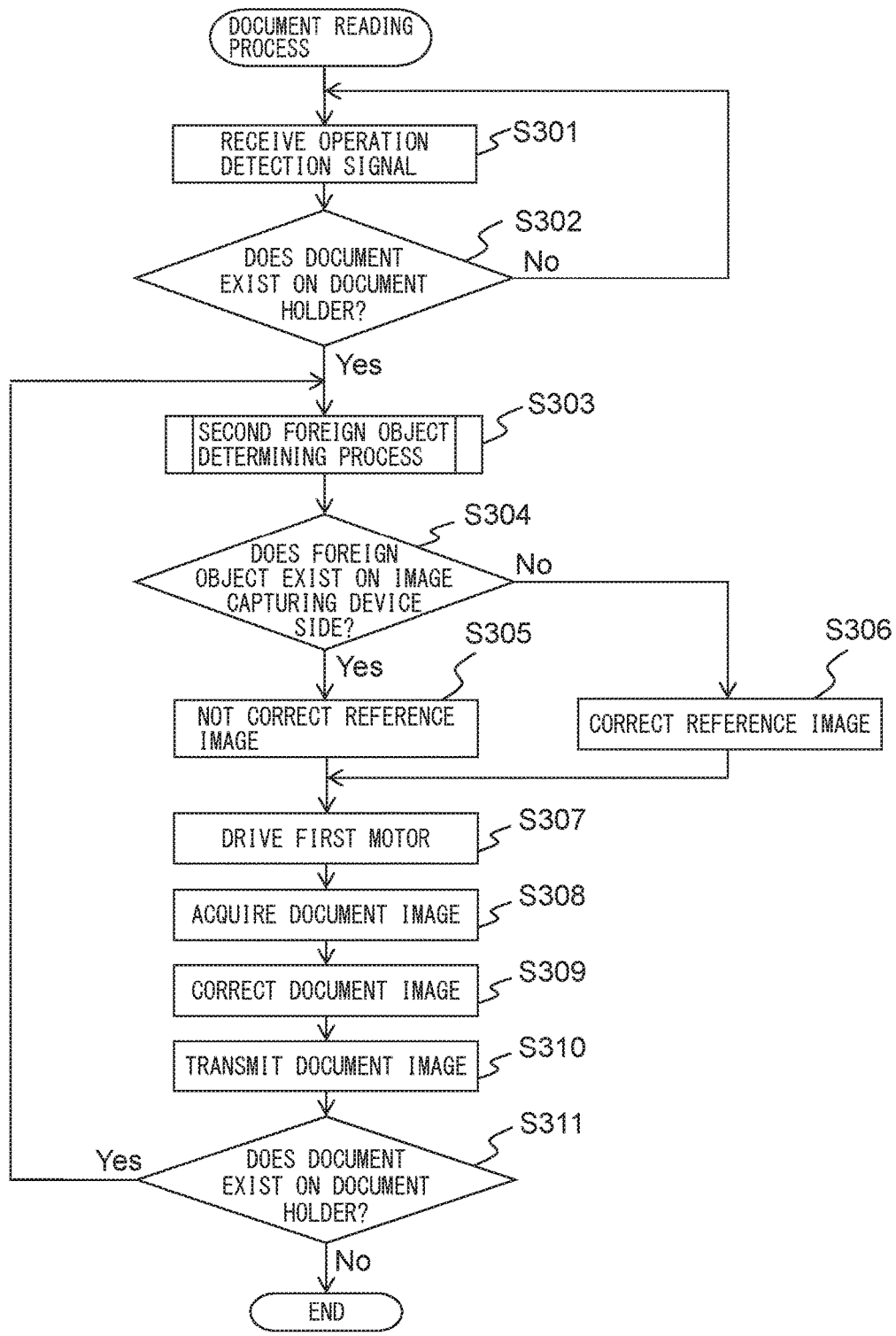
FIG. 12 is a flowchart representing another operational example of the document reading process.

FIG. 12 is a flowchart representing another operational example of the document reading process. The image reading apparatus 100 can execute this flowchart in place of the above-mentioned flowchart illustrated in FIG. 11. In the flowchart illustrated in FIG. 12, unlike the flowchart illustrated in FIG. 11, the position determining module 162 determines whether the foreign object exists on the image capturing device side or on the reference member side, by comparing gradation values of two captured images of the reference member under illumination of light of different light quantities. Since the processes in steps S301, S302, and S305 to S310 illustrated in FIG. 12 are the same as those in steps S201, S202, and S205 to S210 illustrated in FIG. 11, a description thereof will not be given, and only the processes in steps S303, S304, and S311 will be described below.

In step S303, the CPU 300 performs a second foreign object determining process (step S303). In the second foreign object determining process, the foreign object determining module 161 determines whether a foreign object appears in the image. When a foreign object appears in the image, the position determining module 162 determines whether the foreign object exists on the image capturing device side or on the reference member side, by comparing gradation values of two captured images of the reference member under illumination of light of different light quantities. The second foreign object determining process will be described in detail later.

The reference image correcting module 163 determines whether the foreign object has been determined to exist on the side of the first image capturing device 133a or the second image capturing device 133b in the second foreign object determining process step S304).

In step S311, when any document remains on the document tray 103, the CPU 300 returns the process to step S303, in which it repeats the processes in steps S303 to S311. In other words, the CPU 300 determines whether a foreign object appears in the image, and the position of the foreign object, every time one document is transferred.

Figure 13:
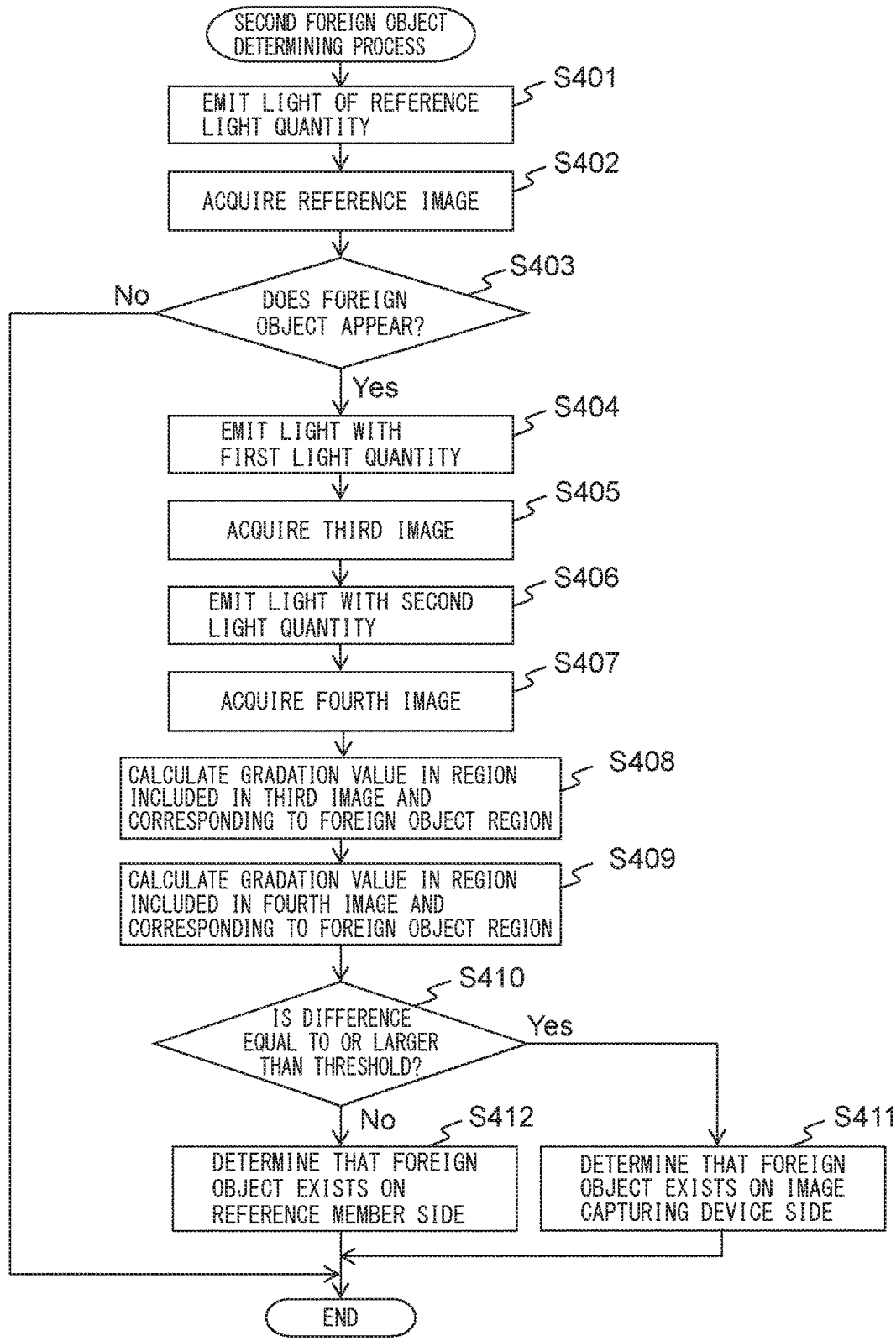
FIG. 13 is a flowchart representing an operational example of a second foreign object determining process.

FIG. 13 is a flowchart representing an operational example of the second foreign object determining process.

The flow illustrated in FIG. 13 is executed at the step S303 in the flowchart illustrated in FIG. 12.

First, the foreign object determining module 161 drives the light source drive circuit 310 to cause the first light source 132a and the second light source 132b to emit light with a reference light quantity (step S401). The reference light quantity is determined by foregoing experiment such that the shading correction can be appropriately performed using the captured reference images of the reference member illuminated with light with this light quantity.

The foreign object determining module 161 drives the image capturing device drive circuit 311 and causes the first image capturing device 133a and the second image capturing device 133b to capture reference images to acquire each reference image (step S402). The reference image captured by the first image capturing device 133a is an image of the second reference member 134b captured under illumination of light with a reference light quantity from the first light source 132a. The reference image captured by the second image capturing device 133b is an image of the first reference member 134a captured under illumination of light with a reference light quantity from the second light source 132b.

Next, the foreign object determining module 161 determines whether a foreign object appears in each of the reference images captured by the first image capturing device 133a and the second image capturing device 133b (step S403). For each of all the pixels in the reference images, for example, the foreign object determining module 161 determines whether or not the pixel has a gradation value within a predetermined range. When the pixel having gradation value outside the predetermined range exists, the foreign object determining module 161 determines that a foreign object appears in this pixel, i.e., a foreign object appears in the reference image. On the other hand, when no pixels have a gradation value outside the predetermined range, the foreign object determining module 161 determines that no foreign objects appear in the reference images.

Images for determining whether or not a foreign object appears are not limited to the reference images, and may be any images so long as the images are captured by the first image capturing device 133a and the second image capturing device 133b. The foreign object determining module 161 may determine whether a foreign object appears in, for example, each of first images or second images or third images or fourth images (to be described later) captured by the first image capturing device 133a and the second image capturing device 133b.

When no foreign object appears in the reference images, the foreign object determining module 161 terminates a series of the steps.

On the other hand, when a foreign object appears in the reference image, the foreign object determining module 161 drives the light source drive circuit 310 to cause the first light source 132a and the second light source 132b to emit light with a first light quantity (step S404). The first light quantity is a light quantity different from the reference light quantity. For example, the first light quantity is set as a light quantity enabling a foreign object and the reference member to be distinguished from each other in the captured image by visual observation when the image capturing device captures the image of the foreign object and the reference member. The first light quantity may be the same as the reference light quantity.

Next, the foreign object determining module 161 drives the image capturing module drive circuit 311 to cause one or both of the first image capturing device 133a and the second image capturing device 133b to capture and acquire the third image (step S405). When a foreign object appears in the reference image captured by the first image capturing device 133a, the position determining module 162 causes the first image capturing device 133a to capture the third image. When a foreign object appears in the reference image captured by the second image capturing device 133b, the position determining module 162 causes the second image capturing device 133b to capture the third image. The third image captured by the first image capturing device 133a is a captured image of the second reference member 134b under illumination of light with the first light quantity from the first light source 132a. On the other hand, the third image captured by the second image capturing device 133b is a captured image of the first reference member 134a under illumination of light with the first light quantity from the second light source 132b.

Next, the position determining module 162 drives the light source drive circuit 310 to cause the first light source 132a and the second light source 132b to emit light with a second light quantity (step S406). The second light quantity is different from the first light quantity. For example, the second light quantity is set as a light quantity enabling a foreign object and the reference member to be distinguished from each other in the captured image by visual observation when the image capturing device captures the foreign object and the reference member. The second light quantity is larger than the first light quantity. The second light quantity may be smaller than the first light quantity.

Next, the position determining module 162 drives the image capturing module drive circuit 311 to cause one or both of the first image capturing device 133a and the second image capturing device 133b to capture and acquire the fourth image (step S407). When a foreign object appears in the reference image captured by the first image capturing device 133a, the position determining module 162 causes the first image capturing device 133a to capture the fourth image. When a foreign object appears in the reference image captured by the second image capturing device 133b, the position determining module 162 causes the second image capturing device 133b to capture the fourth image. The fourth image captured by the first image capturing device 133a is a captured image of the second reference member 134b under illumination of light with the second light quantity from the first light source 132a. On the other hand, the fourth image captured by the second image capturing device 133b is a captured image of the first reference member 134a under illumination of light with the second light quantity from the second light source 132b.

Next, the position determining module 162 calculates a gradation value in the region corresponding to the foreign object region within the third image (step S408), as in step S106.

Next, the position determining module 162 calculates a gradation value in the region corresponding to the foreign object region within the fourth image (step S409), as in step S107.

Next, the position determining module 162 determines whether or not an absolute value of a difference between the calculated gradation value of the region corresponding to the foreign object region within the third image and the gradation value of the region corresponding to the foreign object region included in the fourth image is equal to or larger than a second threshold (step S410), as in step S108. The second threshold is determined, for example by foregoing experiment, to be an average of two averages, one of the two average being an average of an absolute value of a difference between the gradation values calculated when a foreign object is attached to the first glass surface 135a, the other of the two average being an average of an absolute value of a difference between the gradation values calculated when a foreign object is attached to the second glass surface 135b.

When the absolute value of the difference between the respective gradation values is equal to or larger than the second threshold, the position determining module 162 determines that the foreign object exists on the image capturing device side (step S411), and terminates a series of the processes. When the foreign object exists in the reference image captured by the first image capturing device 133a, the position determining module 162 determines that the foreign object exists on the first image capturing device 133a side, i.e., on the first glass surface 135a of the first imaging unit 130a. On the other hand, when the foreign object exists in the reference image captured by the second image capturing device 133b, the position determining module 162 determines that the foreign object exists on the second image capturing device 133b side, i.e., on the second glass surface 135b of the second imaging unit 130b.

On the other hand, when the absolute value of the difference between the respective gradation values is smaller than the second threshold, the position determining module 162 determines that the foreign object exists on the reference member side (step S412), and terminates a series of the processes. When the foreign object exists in the reference image captured by the first image capturing device 133a, the position determining module 162 determines that the foreign object exists on the second reference member 134b side, i.e., on the second glass surface 135b of the second imaging unit 130b. On the other hand, when the foreign object exists in the reference image captured by the second image capturing device 133b, the position determining module 162 determines that the foreign object exists on the first reference member 134a side, i.e., on the first glass surface 135a of the first imaging unit 130a.

At the step S410, the position determining module 162 determines whether or not the absolute value of the difference between the respective gradation values is equal to or larger than the second threshold, for each of a red component, a green component, and a blue component in the third image and the fourth image. When the absolute value of the difference is equal to or larger than the second threshold for any one of the components, the position determining module 162 determines that the foreign object exists on the image capturing device side, and when the absolute value of the difference is smaller than the second threshold for all of the components, the position determining module 162 determines that the foreign object exists on the reference member side. When the absolute value of the difference is equal to or larger than the second threshold for all of the components, the position determining module 162 may determine that the foreign object exists on the image capturing device side, and when the absolute value of the difference is smaller than the second threshold for any one of the components, the position determining module 162 may determine that the foreign object exists on the reference member side.

In this case, the reference image correcting module 163 may correct only a color component for which the absolute value of the difference between the respective gradation values is determined to be smaller than the second threshold in the reference image.

When the receiving module 165 receives the setting that indicates that a plurality of colors are used to capture an image of a document, the position determining module 162 determines whether or not the absolute value of the difference between the gradation values is equal to or larger than the second threshold, for each of the red component, the green component, or the blue component. In contrast to this, when the receiving module 165 receives the setting that indicates that a single color is used to capture an image of a document, the position determining module 162 may determine whether or not the absolute value of the difference between the gradation values is equal to or larger than the second threshold, for one of the red component, the green component, or the blue component. In this case, when the absolute value of the difference between the gradation values is equal to or larger than the second threshold for the one color component, the position determining module 162 determines that the foreign object exists on the image capturing device side, and when the absolute value of the difference is smaller than the second threshold, the position determining module 162 determines that the foreign object exists on the reference member side. With these processes, a position where the foreign object exists can be accurately determined, and a process load can be reduced when a single color is used to capture an image of a document.

In this manner, the position determining module 162 determines whether a position of the foreign object is on the image capturing device side or on the reference member side, based on the absolute value of the difference between the gradation value of the region corresponding to the foreign object region within the third image and the gradation value of the region corresponding to the foreign object region within the fourth image.

The position determining module 162 determines the position of the foreign object, based on the first image and the second image, at the timing of staring up the device, the timing of opening or closing the front surface cover 105a, or the timing of starting communication connection with the information processing device 10, and determines the position of the foreign object, based on the third image and the fourth image at the timing of document transfer.

The position determining module 162 may determine the position of the foreign object, based on all of the first image, the second image, the third image, and the fourth image. For example, the position determining module 162 calculates a first normalized value acquired by normalizing the absolute value of the difference between the gradation value in the foreign object region within the first image and the gradation value in the region corresponding to the foreign object region within the second image. The position determining module 162 further calculates a second normalized value acquired by normalizing the absolute value of the difference between the gradation value in the region corresponding to the foreign object region within the third image and the gradation value in the region corresponding to the foreign object region within the fourth image. When the value acquired by subtracting the second normalized value from the first normalized value is equal to or larger than a third threshold, the position determining module 162 determines that the foreign object exists on the reference member side, and when this value is smaller than the third threshold, the position determining module 162 determines that the foreign object exists on the image capturing device side. The third threshold is determined by, for example, an experiment conducted in advance, like the threshold and the second threshold.

In this case, the position determining module 162 determines the position of the foreign object by comparing gradation values of two captured images of the reference member at different distances between the image capturing device and the reference member, and comparing gradation values of two captured images of the reference member under illumination of light of different light quantities. Thus, the position determining module 162 can more accurately determine the position of the foreign object.

The following describes the reason why comparing gradation values of two captured images of the reference member under illumination of light with different light quantities enables determination of whether a foreign object exists on the image capturing device side or on the reference member side.

A horizontal-plane illumination intensity Eh at a point on a horizontal plane given by a point light source is calculated by the following formula.

$$Eh = (I_\theta/L^2) \times \cos\theta$$

In this formula, $\theta$ is an incident angle of light to the horizontal plane, $I_\theta$ is a light quantity [cd] in the incident direction, and L is a distance [m] from the light source to the point.

In other words, the horizontal-plane illumination intensity Eh is inversely proportional to the square of the distance from the light source to the point, decreases as the distance increases, and increases as the distance decreases.

Figure 14:
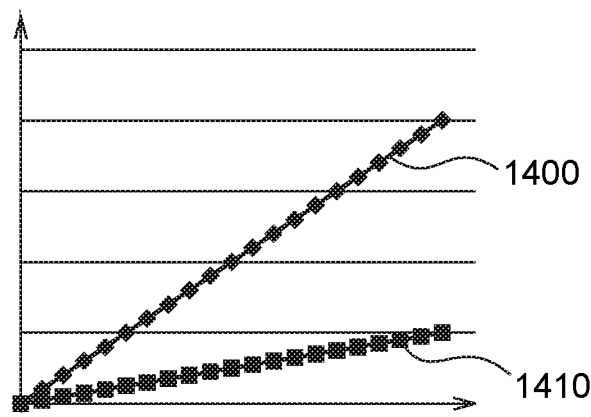
FIG. 14 is a graph expressing a relation between a light quantity of light radiated from a light source and an illumination intensity.

FIG. 14 represents a graph expressing a relation between a light quantity of light radiated from the light source and an illumination intensity.

In FIG. 14, the horizontal axis indicates a light quantity of light radiated from the light source, and the vertical axis indicates an illumination intensity. Since the relation between the first image capturing device 133a and the first light source 132a is the same as the relation between the second image capturing device 133b and the second light source 132b, the relation between the first image capturing device 133a and the first light source 132a is expressed as a representative in FIG. 14.

The graph 1400 in FIG. 14 indicates the relation between a light quantity of light radiated from the first light source 132a and an illumination intensity of a foreign object when the foreign object is attached to the first glass surface 135a (position P1 in FIG. 5) of the first imaging unit 130a. The graph 1410 indicates the relation between a light quantity of light radiated from the first light source 132a and an illumination intensity of a foreign object when the foreign object is attached to the second glass surface 135b (position P2 in FIG. 5) of the second imaging unit 130b. As illustrated in FIG. 14, an illumination intensity of the foreign object attached to the position P1 near the first light source 132a largely changes in accordance with change in a light quantity of light radiated from the first light source 132a. On the other hand, although an illumination intensity of the foreign object attached to the position P2 distant from the first light source 132a also changes in accordance with change in a light quantity of light radiated from the first light source 132a, a degree of this change is smaller than a degree of the change of an illumination intensity of the foreign object attached to the position P1.

As an illumination intensity of a foreign object increases, a gradation value of a pixel where the foreign object appears increases.

Figure 15A:
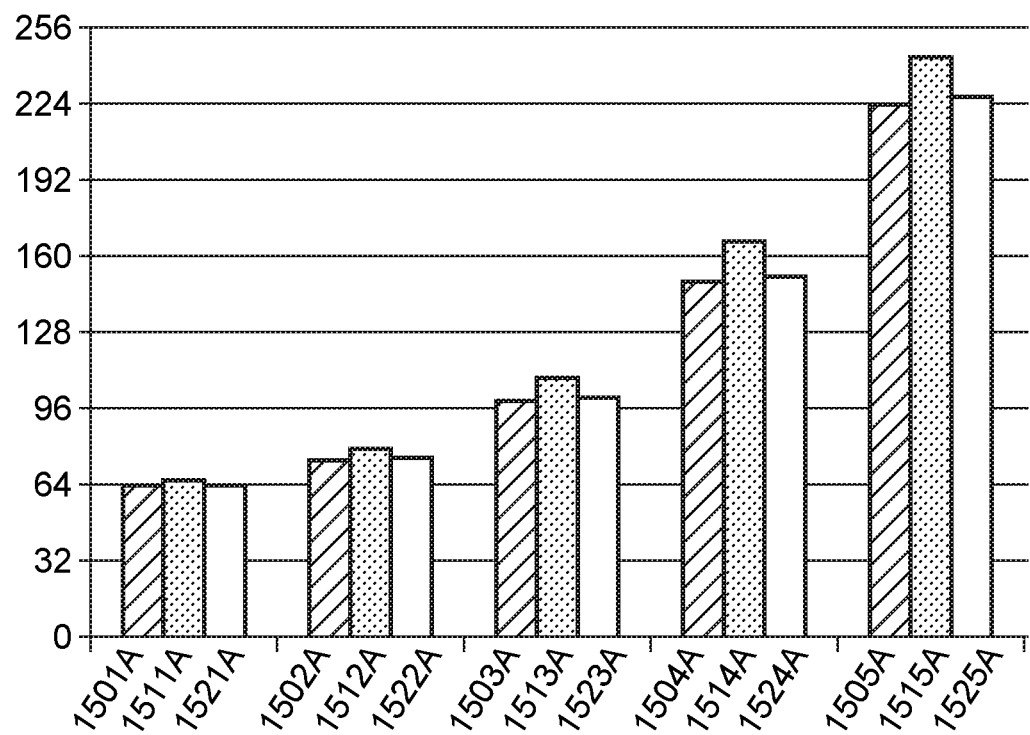
FIG. 15A is a graph expressing a relation between a light quantity of light radiated from the light source and a gradation value.

FIG. 15A, FIG. 15B, and FIG. 15C represent graphs each expressing relation between a light quantity of light radiated from a light source and a gradation value.

The vertical axes in FIG. 15A, FIG. 15B, and FIG. 15C indicate gradation values. A relation between an image captured by the first image capturing device 133a and the first light source 132a is the same as a relation between an image captured by the second image capturing device 133b and the second light source 132b. For this reason, the relation between the image captured by the first image capturing device 133a and the first light source 132a is expressed as a representative in FIG. 15A, FIG. 15B, and FIG. 15C. FIG. 15A represents a graph of red components in the images, FIG. 15B represents a graph of green components in the images, and FIG. 15C represents a graph of blue components in the images.

The graphs 1501A to 1501C, the graphs 1502A to 1502C, the graphs 1503A to 1503C, the graphs 1504A to 1504C, and the graphs 1505A to 1505C indicate gradation values of the captured pixels of the second reference member 134b to which no foreign objects are attached under illumination with light quantities that are 0.12.5 time, 0.25 time, 0.5 time, 1 time, and 2 times the reference light quantity, respectively. The graphs 1511A to 1511C, the graphs 1512A to 1512C, the graphs 1513A to 1513C, the graphs 1514A to 1514C, and the graphs 1515A to 1515C indicate gradation values of the captured pixels of a foreign object attached to the first glass surface 135a (P1) under illumination with light quantities that are 0.125 time, 0.25 time, 0.5 time, 1 time, and 2 times the reference light quantity, respectively. The graphs 1521A to 1521C, the graphs 1522A to 1522C, the graphs 1523A to 1523C, the graphs 1524A to 1524C, and the graphs 1525A to 1525C indicate gradation values of the captured pixels of a foreign object attached to the second glass surface 135*b* (P2) under illumination with light quantities that are 0.125 time, 0.25 time, 0.5 time, 1 time, and 2 times the reference light quantity, respectively.

As illustrated in FIG. 15A to FIG. 15C, a gradation value of the captured pixel of the foreign object attached to the first glass surface 135*a* (on the image capturing device side) largely changes in accordance with change in a light quantity. On the other hand, although a gradation value of the captured pixel of the foreign object attached to the second glass surface 135*b* (on the reference member side) also changes in accordance with change in a light quantity, a degree of this change is smaller than a degree of the change in a gradation value of the captured pixel of the foreign object attached to the first glass surface 135*a* (on the image capturing device side). Accordingly, comparing gradation values of two captured images of the reference member illuminated with light of different light quantities makes it possible to determine whether a foreign object exists on the image capturing device side or on the reference member side.

FIG. 16A to FIG. 16C and FIG. 17A to FIG. 17C represent graphs for expressing the reference image, the third image, and the fourth image.

In FIG. 16A to FIG. 16C and FIG. 17A to FIG. 17C, the horizontal axes indicate coordinates of the respective images in the horizontal direction, and the vertical axes indicate gradation values. The reference image, the third image, and the fourth image expressed by FIG. 16A to FIG. 16C and FIG. 17A to FIG. 17C are one-line images extending in the horizontal direction. Since a foreign object appears in the same manner in an image captured by either one of the first image capturing device 133*a* and the second image capturing device 133*b*, the images captured by the first image capturing device 133*a* are expressed as representatives in FIG. 16A to FIG. 16C and FIG. 17A to FIG. 17C.

Figure 16A:
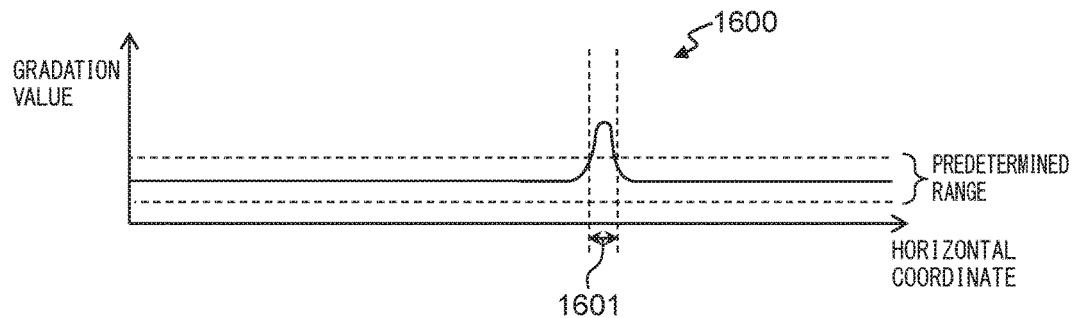
FIG. 16A is a graph for illustrating a reference image.

The graph 1600 in FIG. 16A expresses one example of the captured reference image of a foreign object illuminated with the reference light quantity when the foreign object is attached to the first glass surface 135*a* of the first imaging unit 130*a*. As illustrated in FIG. 16A, in the reference image, the second reference member 134*b* appears in respective pixels where the foreign object does not appear. For this reason, in these pixels, the change of gradation value is small, and each gradation value stays within a predetermined range. On the other hand, in the foreign object region 1601 where the foreign object appears, the change of a gradation value is large, and each gradation value deviates from the predetermined range.

Figure 16B:
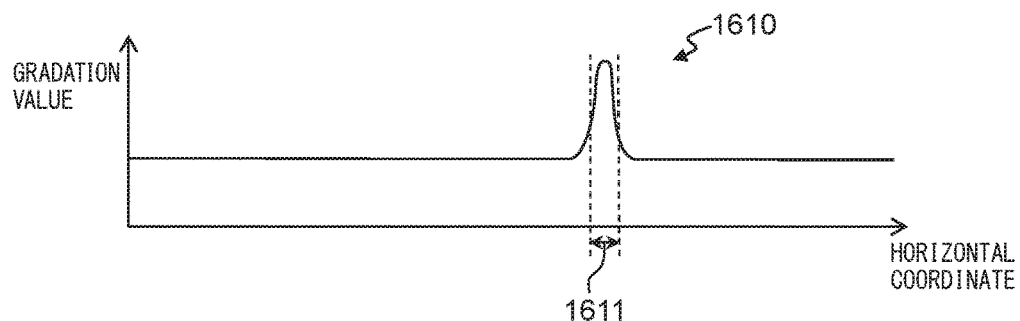
FIG. 16B is a graph for illustrating a third image.

The graph 1610 in FIG. 16B expresses one example of the captured third image of a foreign object illuminated with a light quantity that is twice the reference light quantity when the foreign object is attached to the first glass surface 135*a* of the first imaging unit 130*a*. In this case, gradation values in the region 1611 corresponding to the foreign object region 1601 within the third image dramatically rise more than the gradation values in the foreign object region 1601 within the reference image.

Figure 16C:
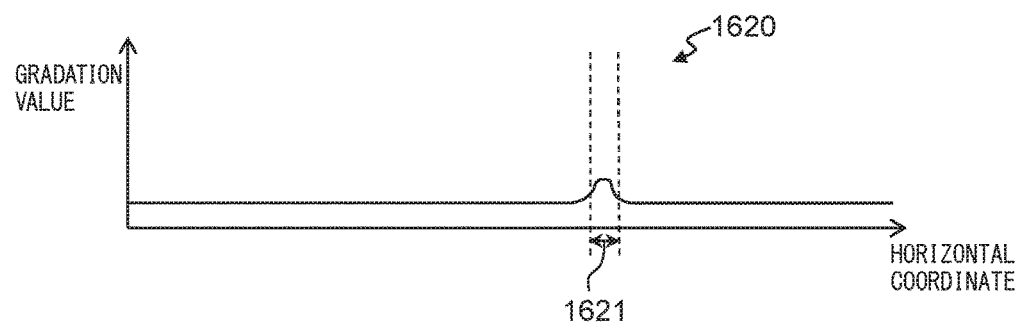
FIG. 16C is a graph for illustrating a fourth image.

The graph 1620 in FIG. 16C expresses one example of the captured fourth image of a foreign object illuminated with a light quantity that is 0.125 time the reference light quantity when the foreign object is attached to the first glass surface 135*a* of the first imaging unit 130*a*. In this case, gradation values in the region 1621 corresponding to the foreign object region 1601 within the fourth image dramatically falls less than the gradation values in the foreign object region 1601 in the reference image.

Figure 17A:
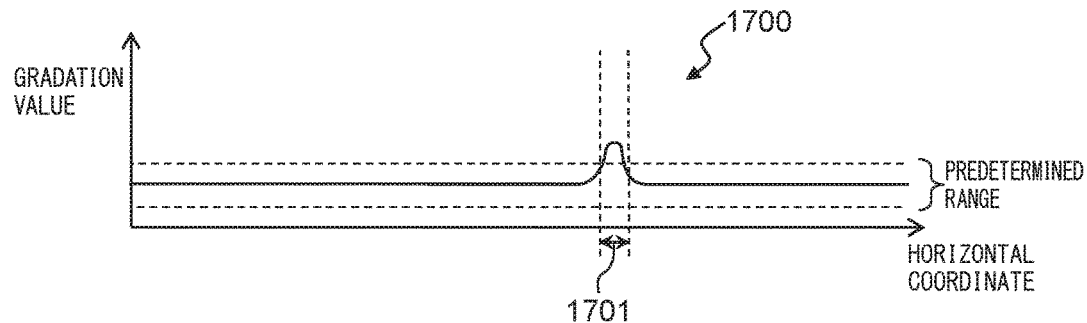
FIG. 17A is a graph for illustrating a reference image.

The graph 1700 in FIG. 17A expresses one example of the captured reference image of a foreign object illuminated with the reference light quantity when the foreign object is attached to the second glass surface 135*b* of the second imaging unit 130*b*.

Figure 17B:
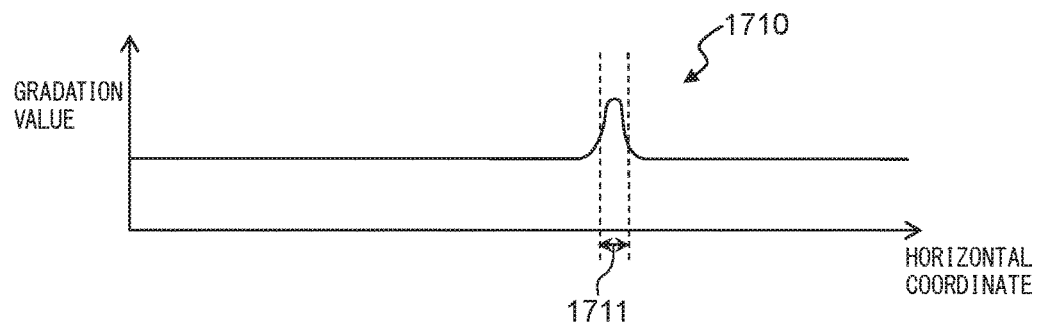
FIG. 17B is a graph for illustrating a third image.

The graph 1710 in FIG. 17B expresses one example of the captured included in the third image of a foreign object illuminated with a light quantity that is twice the reference light quantity when the foreign object is attached to the second glass surface 135*b* of the second imaging unit 130*b*. In this case, although gradation values in the region 1711 corresponding to the foreign object region 1701 within the third image rise more than the gradation values in the foreign object region 1701 within the reference image, the rising degree is small.

Figure 17C:
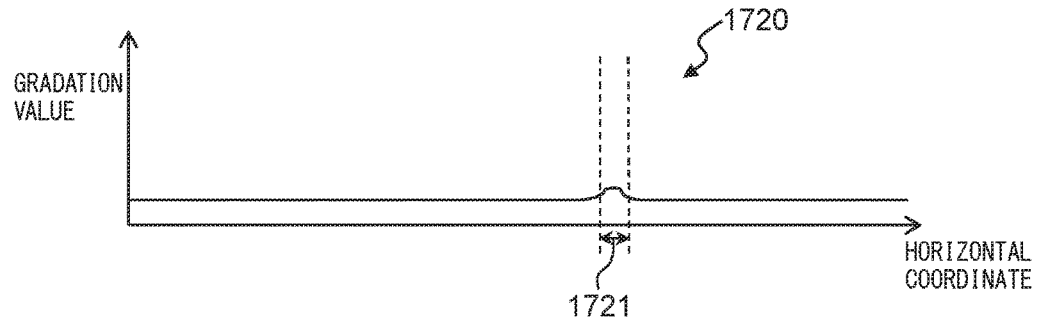
FIG. 17C is a graph for illustrating a fourth image.

The graph 1720 in FIG. 17C expresses one example of the captured fourth image of a foreign object illuminated with a light quantity that is 0.125 time the reference light quantity when the foreign object is attached to the second glass surface 135*b* of the second imaging unit 130*b*. In this case, although gradation values in the region 1721 corresponding to the foreign object region 1701 within the fourth image fall less than the gradation values in the foreign object region 1701 in the reference image, the falling degree is small.

Thus, the position determining module 162 can determine whether the foreign object exists on the image capturing device side or on the reference member side with high accuracy, by comparing gradation values corresponding to the foreign object region within the third image, with gradation values corresponding to the foreign object region within the fourth image.

Figure 18:
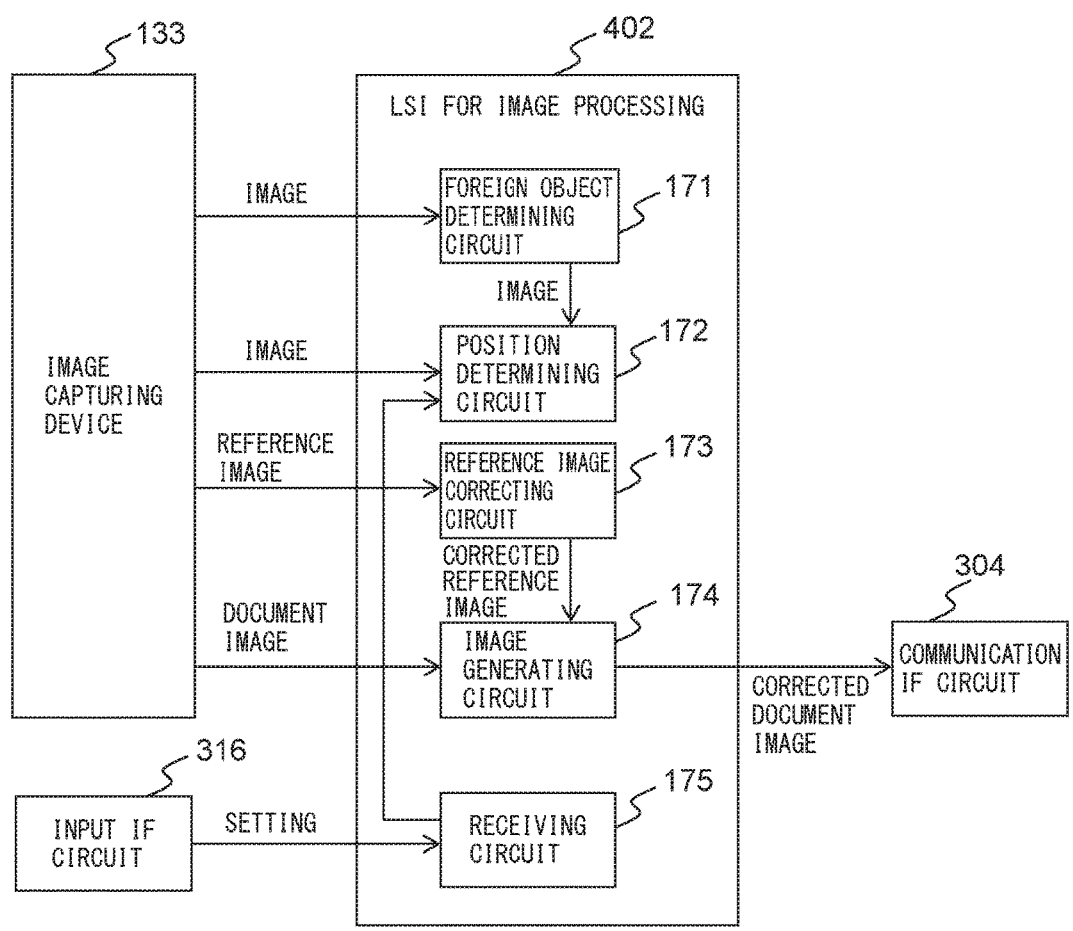
FIG. 18 is a block diagram illustrating a schematic configuration of another LSI 402 for image processing.

FIG. 18 is a block diagram illustrating a schematic configuration of an LSI 402 for image processing in an image reading apparatus according to another embodiment.

The LSI 402 for image processing is used instead of the LSI 302 for image processing in the image reading apparatus 100, and substitutes for the CPU 300 to perform the foreign object determining process and the document reading process. The LSI 402 for image processing includes a foreign object determining circuit 171, a position determining circuit 172, a reference image correcting circuit 173, an image generating circuit 174, a receiving circuit 175, and the like.

The foreign object determining circuit 171 is one example of a foreign object determining module, and has the same function as that of the foreign object determining module 161. The foreign object determining circuit 171 receives the respective images from the image capturing device 133, and determine whether or not a foreign object appears in the respective images.

The position determining circuit 172 is one example of a position determining module, and has the same function as that of the position determining module 162. When the foreign object determining circuit 171 determines that a foreign object appears in the images, the position determining circuit 172 receives the images from the image capturing device 133, and determines whether the foreign object exists on the image capturing device side or on the reference member side, based on the respective images.

The reference image correcting circuit 173 is one example of a reference image correcting module, and has the same function as that of the reference image correcting module 163. The reference image correcting circuit 173 acquires the reference image from the image capturing device 133. The reference image correcting circuit 173 does not correct the reference image when the foreign object exists on the image capturing device side, but corrects the reference image when the foreign object exists on the reference member side.

The image generating circuit 174 is one example of an image generating module, and has the same function as that of the image generating module 164. The image generating circuit 174 acquires a document image from the image capturing device 133, uses the reference image to correct the document image, and transmits the corrected document image to the information processing device 10 via the communication IF circuit 304.

The receiving circuit 175 is one example of a receiving module, and has the same function as that of the receiving module 165. The receiving circuit 175 receives from the input IF circuit 316 the setting that indicates which of a single color and a plurality of colors is used to capture an image of a document.

As described in detail above, the image reading apparatus can accurately determine an existing position of a foreign object, also in the case of using the LSI 402 for image processing.

REFERENCE SIGNS LIST

100 image reading apparatus
130*a* first imaging unit
130*b* second imaging unit
132*a* first light source
132*b* first light source
133*a* first image capturing device
133*b* second image capturing device
134*a* first reference member
134*b* second reference member
314*b* second motor
161 foreign object determining module
162 position determining module
163 reference image correcting module
165 receiving module

The invention claimed is:

1. An image reading apparatus comprising:
a first unit fixed to the image reading apparatus;
a second unit movable between a first position facing the first unit and a second position facing the first unit and more separated from the first unit than the first position;
an image capturing device, provided in one of the first unit or the second unit, for capturing a first image and a second image;
a reference member provided in another one of the first unit or the second unit;
a driving device for moving the second unit between the first position and the second position; and
a processor configured to
determine whether or not a foreign object appears in the first image, and
determine whether the foreign object exists on a side of the image capturing device or on a side of the reference member, based on an absolute value of a difference between a gradation value in a region where the foreign object appears within the first image, and a gradation value in a region where the foreign object appears within the second image when the foreign object appears in the first image,
wherein the first image is an image of the reference member captured when the second unit is at one of the first position or the second position, and the second image is an image of the reference member captured when the second unit is provided at another one of the first position or the second position.

2. The image reading apparatus according to claim 1, wherein the processor determines that the foreign object exists on the side of the image capturing device when the absolute value of the difference is smaller than a predetermined threshold, and the processor determines that the foreign object exists on the side of the reference member when the absolute value of the difference is equal to or larger than the predetermined threshold.

3. The image reading apparatus according to claim 1, wherein
the image capturing device further captures a reference image for correcting a document image that is a captured image of a document, and
the processor does not correct the reference image when the foreign object exists on the side of the image capturing device, and corrects the reference image when the foreign object exists on the side of the reference member.

4. The image reading apparatus according claim 1, wherein the second unit is movable by a document transferred to the image reading apparatus, even when the driving device is inactive.

5. The image reading apparatus according to claim 1, further comprising a light source for emitting light to the reference member,
wherein the image capturing device further captures a third image of the reference member captured under illumination of the light with a first light quantity from the light source, and a fourth image of the reference member captured under illumination of the light with a second light quantity from the light source, the second light quantity being different from the first light quantity, and
the processor determines whether the foreign object exists on the side of the image capturing device or on the side of the reference member, based on an absolute value of a difference between a gradation value in the region where the foreign object appears within the third image, and a gradation value in a region where the foreign object appears within the fourth image.

6. The image reading apparatus according to claim 5, wherein the processor determines a position where the foreign object appears, based on the first image and the second image, at a time of staring up the image capturing device, and determines a position where the foreign object appears, based on the third image and the fourth image, at a time of document transfer.

7. A control method of an image reading apparatus including a first unit fixed to the image reading apparatus, a second unit movable between a first position facing the first unit and a second position facing the first unit and more separated from the first unit than the first position, an image capturing device, provided in one of the first unit or the second unit for capturing a first image and a second image, a reference member provided in another one of the first unit or the second unit, and a driving device for moving the second unit between the first position and the second position, the method comprising:
determining whether or not a foreign object appears in the first image; and
determining whether the foreign object exists on a side of the image capturing device or on a side of the reference member, based on an absolute value of a difference between a gradation value in a region where the foreign object appears within the first image, and a gradation value in a region where the foreign object appears within the second image when the foreign object appears in the first image, wherein the first image is an image of the reference member captured when the second unit is at one of the first position or the second position, and the second image is an image of the reference member captured when the second unit is provided at another one of the first position or the second position.

8. A computer-readable, non-transitory medium storing a computer program, wherein the computer program causes an image reading apparatus including a first unit fixed to the image reading apparatus, a second unit movable between a first position facing the first unit and a second position facing the first unit and more separated from the first unit than the first position, an image capturing device, provided in one of the first unit or the second unit for capturing a first image and a second image, a reference member provided in the other of the first unit or the second unit, and a driving device for moving the second unit between the first position and the second position, to execute a process, the process comprising:

determining whether or not a foreign object appears in the first image; and determining whether the foreign object exists on a side of the image capturing device or on a side of the reference member, based on an absolute value of a difference between a gradation value in a region where the foreign object appears within the first image, and a gradation value in a region where the foreign object appears within the second image when the foreign object appears in the first image, wherein the first image is an image of the reference member captured when the second unit is at one of the first position or the second position, and the second image is an image of the reference member captured when the second unit is provided at another one of the first position or the second position.

* * * * *